(12) United States Patent
Kubota

(10) Patent No.: US 9,602,406 B2
(45) Date of Patent: Mar. 21, 2017

(54) DATA TRANSFER CONTROL DEVICE AND DATA TRANSFER CONTROL METHOD

(71) Applicant: FUJITSU LIMITED, Kawasaki-shi, Kanagawa (JP)

(72) Inventor: Makoto Kubota, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 111 days.

(21) Appl. No.: 14/640,065

(22) Filed: Mar. 6, 2015

(65) Prior Publication Data

US 2015/0281074 A1    Oct. 1, 2015

(30) Foreign Application Priority Data

Mar. 28, 2014   (JP) ................................ 2014-069544

(51) Int. Cl.
| | |
|---|---|
| H04L 12/741 | (2013.01) |
| H04B 7/155 | (2006.01) |
| H04L 12/24 | (2006.01) |
| H04L 12/26 | (2006.01) |
| H04L 12/751 | (2013.01) |
| H04L 12/707 | (2013.01) |
| H04L 12/721 | (2013.01) |
| H04W 40/12 | (2009.01) |

(Continued)

(52) U.S. Cl.
CPC ............ *H04L 45/745* (2013.01); *H04L 41/12* (2013.01); *H04L 43/0852* (2013.01); *H04L 45/02* (2013.01); *H04L 45/24* (2013.01); *H04L 45/70* (2013.01); *H04L 47/20* (2013.01); *H04W 24/08* (2013.01)

(58) Field of Classification Search
None
See application file for complete search history.

(56) References Cited

U.S. PATENT DOCUMENTS

| 5,648,966 A | 7/1997 | Kondo et al. | |
|---|---|---|---|
| 2012/0005371 A1* | 1/2012 | Ravindran | ............ H04L 45/50 709/242 |

FOREIGN PATENT DOCUMENTS

| JP | 8-97818 | 4/1996 |
|---|---|---|
| JP | 9-186718 | 7/1997 |
| JP | 11-331194 | 11/1999 |

(Continued)

OTHER PUBLICATIONS

S. Sharma, D. et al. "Fast failure recovery for in-band OpenFlow networks," 2013, Design of Reliable Communication Networks (DRCN), 2013 9th International Conference on the, Budapest, pp. 52-59.*

*Primary Examiner* — Charles C Jiang
*Assistant Examiner* — Saad Khawar
(74) *Attorney, Agent, or Firm* — Fujitsu Patent Center

(57) ABSTRACT

A data transfer control device is provided with a storage configured to store management information that manages a topology of relay devices and a delay of a link between each adjacent relay devices where a link exists, and a processor executing the processing of specifying a main signal path and a detouring path that make an accommodation destination device an exit, allocating an identical label value to the main signal paths while allocating a separate label value different from the label value of the main signal path to the detouring paths respectively, generating a rule for a detouring label value management table, and transmitting the rule to relay devices that are subject to distribution.

9 Claims, 30 Drawing Sheets

(51) Int. Cl.
*H04W 24/08* (2009.01)
*H04L 12/813* (2013.01)

(56) References Cited

FOREIGN PATENT DOCUMENTS

JP            2009-10438        1/2009

\* cited by examiner

F I G. 3

| START END \ TERMINAL END | GW1 | GW2 | GW3 | GW4 | GW5 | GW6 |
|---|---|---|---|---|---|---|
| GW1 | 0 | 10 | 80 | 80 | 40 | 40 |
| GW2 | 10 | 0 | 10 | 30 | 80 | 80 |
| GW3 | 80 | 10 | 0 | 10 | 80 | 30 |
| GW4 | 80 | 30 | 10 | 0 | 80 | 10 |
| GW5 | 40 | 80 | 80 | 80 | 0 | 10 |
| GW6 | 40 | 80 | 30 | 10 | 10 | 0 |

T1

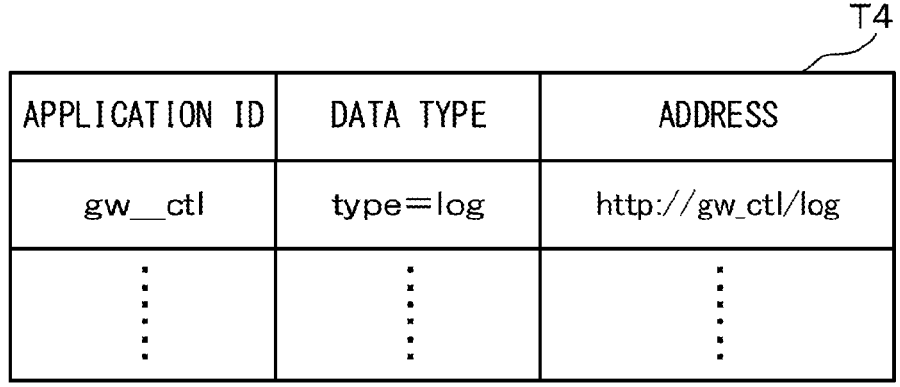
F I G. 6

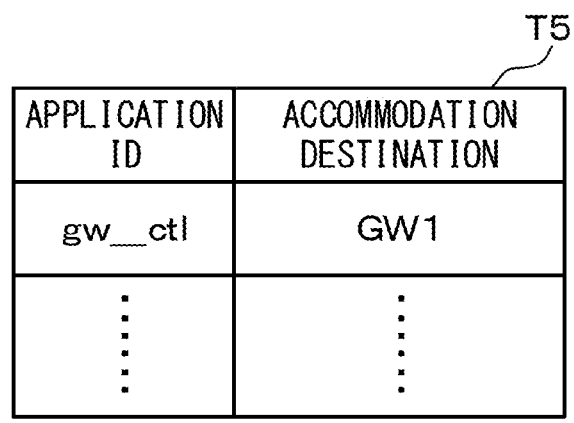
F I G. 7

| MAIN SIGNAL LABEL VALUE | ASSUMED ABNORMAL GW | ENTRY GW | EXIT GW | DETOURING PATH P2 | DETOURING LABEL VALUE |
|---|---|---|---|---|---|
| L1 | GW2 | GW3 | GW1 | GW3, GW4, GW6, GW1 | L7 |
| | | GW4 | | GW4, GW3, GW4, GW6, GW1 | L7 |
| | | GW5 | | GW5, GW6, GW1 | L1 |
| | | GW6 | | GW6, GW1 | L1 |
| | GW3 | GW2 | | GW2, GW1 | L1 |
| | | GW4 | | GW4, GW2, GW1 | L8 |
| | | GW5 | | GW5, GW6, GW1 | L1 |
| | | GW6 | | GW6, GW1 | L1 |
| | GW4 | GW2 | | GW2, GW1 | L1 |
| | | GW3 | | GW3, GW2, GW1 | L1 |
| | | GW5 | | GW5, GW6, GW1 | L1 |
| | | GW6 | | GW6, GW1 | L1 |
| | GW5 | GW2 | | GW2, GW1 | L1 |
| | | GW3 | | GW3, GW2, GW1 | L1 |
| | | GW4 | | GW4, GW3, GW2, GW1 | L1 |
| | | GW6 | | GW6, GW1 | L1 |
| | GW6 | GW2 | | GW2, GW1 | L1 |
| | | GW3 | | GW3, GW2, GW1 | L1 |
| | | GW4 | | GW4, GW3, GW2, GW1 | L1 |
| | | GW5 | | GW5, GW1 | L9 |

FIG. 9

| LABEL VALUE | IN-USE |
|---|---|
| 1 | 1 |
| 2 | 1 |
| 3 | 1 |
| 4 | 1 |
| 5 | 1 |
| 6 | 1 |
| 7 | 0 |
| 8 | 0 |
| 9 | 0 |
| ⋮ | ⋮ |

T8

F I G. 1 0

GW1

| LABEL VALUE | TRANSFER DESTINATION GW |
|---|---|
| L1 | Local |
| ⋮ | ⋮ |

T9

F I G. 1 2 A

GW2

| LABEL VALUE | TRANSFER DESTINATION GW |
|---|---|
| L1 | GW1 |
| ⋮ | ⋮ |

T9

F I G. 1 2 B

GW3

| LABEL VALUE | TRANSFER DESTINATION GW |
|---|---|
| L1 | GW2 |
| ⋮ | ⋮ |

T9

F I G. 1 2 C

GW4

| LABEL VALUE | TRANSFER DESTINATION GW |
|---|---|
| L1 | GW3 |
| ⋮ | ⋮ |

T9

F I G. 1 2 D

GW5

| LABEL VALUE | TRANSFER DESTINATION GW |
|---|---|
| L1 | GW6 |
| ⋮ | ⋮ |

T9

F I G. 1 2 E

GW6

| LABEL VALUE | TRANSFER DESTINATION GW |
|---|---|
| L1 | GW1 |
| ⋮ | ⋮ |

T9

F I G. 1 2 F

| GW | ADDRESS |
|---|---|
| ⋮ | ⋮ |

GW1 — T10

F I G. 1 3 A

| GW | ADDRESS |
|---|---|
| GW1 | IP1 |
| ⋮ | ⋮ |

GW2 — T10

F I G. 1 3 B

| GW | ADDRESS |
|---|---|
| GW2 | IP2 |
| ⋮ | ⋮ |

GW3 — T10

F I G. 1 3 C

| GW | ADDRESS |
|---|---|
| GW3 | IP3 |
| ⋮ | ⋮ |

GW4 — T10

F I G. 1 3 D

| GW | ADDRESS |
|---|---|
| GW6 | IP6 |
| ⋮ | ⋮ |

GW5 — T10

F I G. 1 3 E

| GW | ADDRESS |
|---|---|
| GW1 | IP1 |
| ⋮ | ⋮ |

GW6 — T10

F I G. 1 3 F

GW1

| LABEL VALUE | TRANSFER DESTINATION GW |
|---|---|
| L1 | Local |
| L7 | Local |
| L8 | Local |
| L9 | Local |

F I G. 1 4 A

GW2

| LABEL VALUE | TRANSFER DESTINATION GW |
|---|---|
| L1 | GW1 |
| L8 | GW1 |

F I G. 1 4 B

GW3

| LABEL VALUE | TRANSFER DESTINATION GW |
|---|---|
| L1 | GW2 |
| L7 | GW4 |

F I G. 1 4 C

GW4

| LABEL VALUE | TRANSFER DESTINATION GW |
|---|---|
| L1 | GW3 |
| L7 | GW6 |
| L8 | GW2 |

F I G. 1 4 D

GW5

| LABEL VALUE | TRANSFER DESTINATION GW |
|---|---|
| L1 | GW6 |
| L9 | GW1 |

F I G. 1 4 E

GW6

| LABEL VALUE | TRANSFER DESTINATION GW |
|---|---|
| L1 | GW1 |
| L7 | GW1 |

F I G. 1 4 F

GW1

| GW | ADDRESS |
|---|---|
| — | — |

F I G. 1 5 A

GW2

| GW | ADDRESS |
|---|---|
| GW1 | IP1 |

F I G. 1 5 B

GW3

| GW | ADDRESS |
|---|---|
| GW2 | IP2 |
| GW4 | IP4 |

F I G. 1 5 C

GW4

| GW | ADDRESS |
|---|---|
| GW2 | IP2 |
| GW3 | IP3 |
| GW6 | IP6 |

F I G. 1 5 D

GW5

| GW | ADDRESS |
|---|---|
| GW1 | IP1 |
| GW6 | IP6 |

F I G. 1 5 E

GW6

| GW | ADDRESS |
|---|---|
| GW1 | IP1 |

F I G. 1 5 F

GW3    T13

| LABEL VALUE AT NORMAL STATE | ABNORMAL GW | DETOURING LABEL VALUE |
|---|---|---|
| L1 | GW2 | L7 |

F I G. 1 6 A

GW4    T13

| LABEL VALUE AT NORMAL STATE | ABNORMAL GW | DETOURING LABEL VALUE |
|---|---|---|
| L1 | GW3 | L8 |

F I G. 1 6 B

GW5    T13

| LABEL VALUE AT NORMAL STATE | ABNORMAL GW | DETOURING LABEL VALUE |
|---|---|---|
| L1 | GW6 | L9 |

F I G. 1 6 C

| GW1 | T14 |
|---|---|
| DATA TYPE | LABEL VALUE |
| type=log | L1 |
| ⋮ | ⋮ |

F I G. 1 7 A

| GW2 | T14 |
|---|---|
| DATA TYPE | LABEL VALUE |
| type=log | L1 |
| ⋮ | ⋮ |

F I G. 1 7 B

| GW3 | T14 |
|---|---|
| DATA TYPE | LABEL VALUE |
| type=log | L1 |
| ⋮ | ⋮ |

F I G. 1 7 C

| GW4 | T14 |
|---|---|
| DATA TYPE | LABEL VALUE |
| type=log | L1 |
| ⋮ | ⋮ |

F I G. 1 7 D

| GW5 | T14 |
|---|---|
| DATA TYPE | LABEL VALUE |
| type=log | L1 |
| ⋮ | ⋮ |

F I G. 1 7 E

| GW6 | T14 |
|---|---|
| DATA TYPE | LABEL VALUE |
| type=log | L1 |
| ⋮ | ⋮ |

F I G. 1 7 F

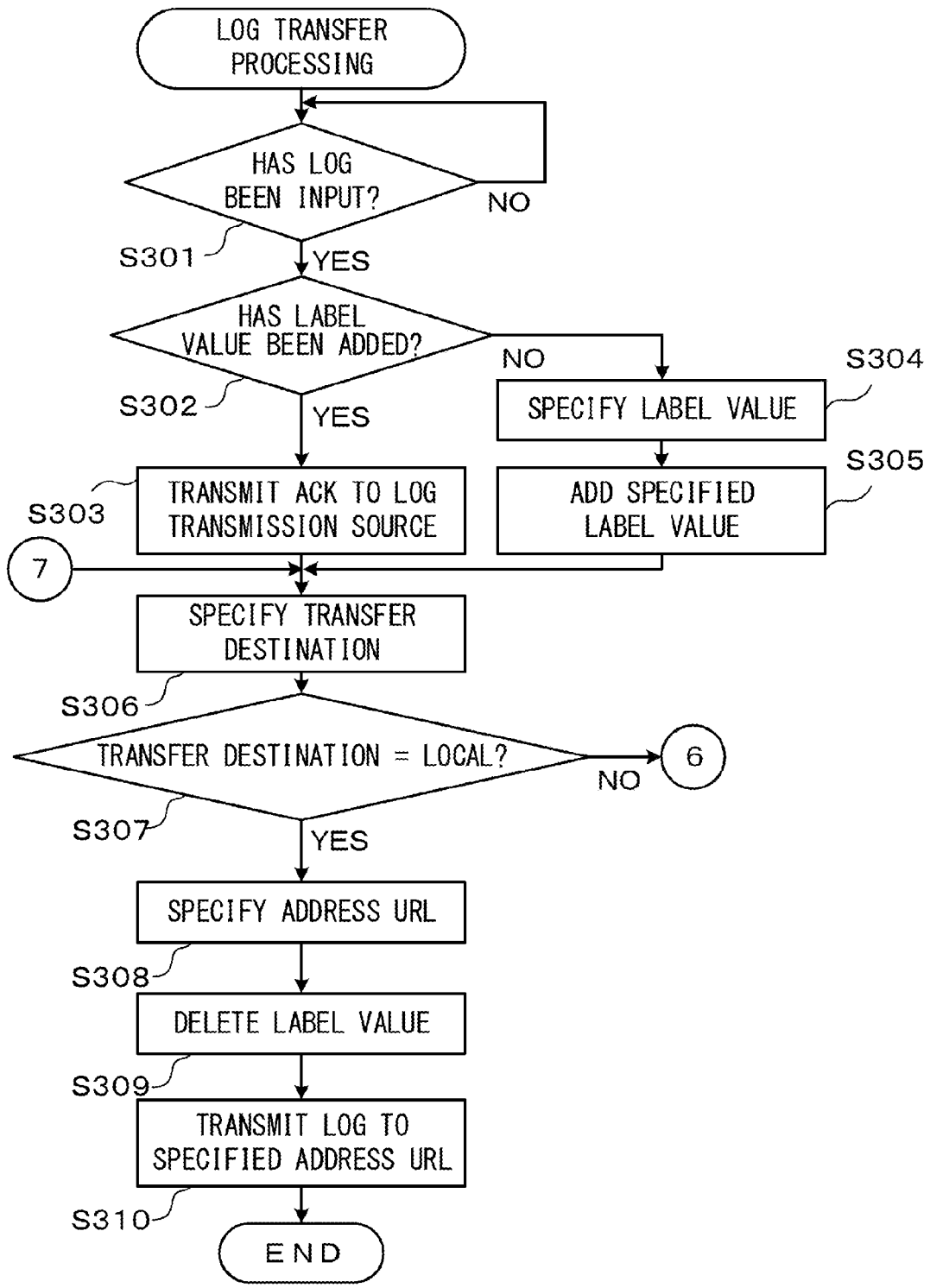
F I G. 2 4

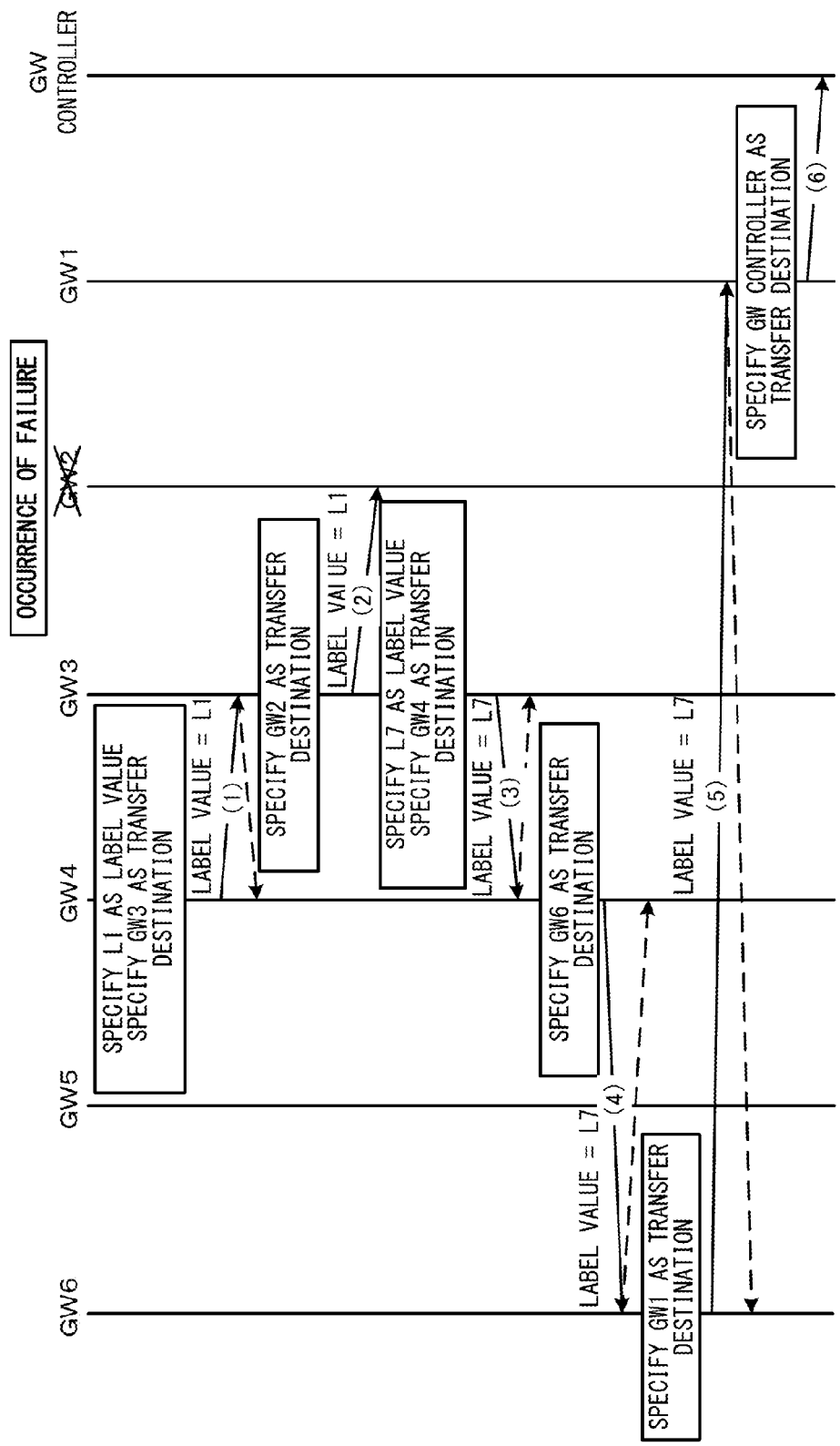
F I G. 27

FIG. 28

| MAIN SIGNAL LABEL VALUE | FIRST ASSUMED ABNORMAL GW | SECOND ASSUMED ABNORMAL GW | ENTRY GW | EXIT GW | DETOURING PATH P2 | DETOURING LABEL VALUE |
|---|---|---|---|---|---|---|
| L1 | GW2 | — | GW3 | GW1 | GW3, GW4, GW6, GW1 | L7 |
| | | | GW4 | | GW4, GW3, GW4, GW6, GW1 | L7 |
| | | | GW5 | | GW5, GW6, GW1 | L1 |
| | | | GW6 | | GW6, GW1 | L1 |
| | | GW3 | GW4 | | GW4, GW6, GW1 | L7 |
| | | | GW5 | | GW5, GW6, GW1 | L1 |
| | | | GW6 | | GW6, GW1 | L1 |
| | | GW4 | GW3 | | GW3, GW6, GW1 | L10 |
| | | | GW5 | | GW5, GW6, GW1 | L1 |
| | | | GW6 | | GW6, GW1 | L1 |
| | ...... | ...... | ...... | | ...... | ...... |

T7

DATA TRANSFER CONTROL DEVICE AND DATA TRANSFER CONTROL METHOD

CROSS-REFERENCE TO RELATED APPLICATION

This application is based upon and claims the benefit of priority of the prior Japanese Patent Application No. 2014-069544, filed on Mar. 28, 2014, the entire contents of which are incorporated herein by reference.

FIELD

The present invention relates to a data transfer control device and a data transfer control method.

BACKGROUND

In recent years, overlay networks have been spreading rapidly. This is because overlay networks enable the enhancement of security, improvement of service quality, and improvement of reliability.

Also, research on techniques for maintaining an optimal path as a path of the overlay network is ongoing (refer to Patent Document 1, for example). In the following, as an overlay network, a gateway device terminates the connection and determines the transfer path in response to the message header and body (i.e. data), assuming the overlay network of an application layer.

To maintain an optimal path of the overlay network, the data transfer control device that performs routing needs to periodically collect the link state between the gateway devices configuring the overlay network from each gateway device. Here, a link state is defined as the delay and the residual bandwidth of the TCP connection between the gateway devices.

When the data transfer control device directly collects the link state from all of the gateway devices configuring the overlay network, the load of the data transfer control device becomes very high. In other words, there is a problem in that the number of connections is very large. For example, when the number of the gateway devices is a thousand units, a thousand connections will be established with the data transfer control unit regularly. Generally, when the number of connections becomes on a scale of several thousand to tens of thousands, the performance of the devices is significantly deteriorated, which is problematic in terms of scale.

To reduce the number of connections, when the data transfer control device collects the link state, it is conceivable to transfer the link state via the gateway device along the path on the above-mentioned overlay network. According to this method, for the data transfer control device, even when the link state from either gateway is received, it may be enough to establish at least one connection with the gateway devices serving as the last hop on the path, thereby making it possible to solve the problem of the number of connections.

However, in the course of transferring the link state via the gateway devices along the path on the overlay network, when an abnormality such as a delay and a GW failure occurs, the link state does not reach the data transfer control device. Therefore, the data transfer control device cannot detect the abnormality between the gateway devices, and thus there is a problem in that an optimal path cannot be continuously maintained.

Patent Document 1: Japanese Patent Application Laid-Open No. 2009-10438

SUMMARY

A data transfer control device according to an aspect, which controls a data transfer path for relay devices configuring a network system, includes a storage which stores management information for managing a topology of the relay devices and a delay of a link for each adjacent relay device where the link exists; and a processor which executes a process including: specifying in accordance with the topology and the delay of the link, a first transfer path for information indicative of a link state including the delay of the link, which is a path with an entry defined by each relay device and an exit defined by an accommodation destination device that is a relay device installed immediately in front of the data transfer control device itself, respectively; specifying in accordance with the topology and the delay of the link, under the assumption that an abnormality occurs at the transfer destination corresponding to the first transfer path, a second transfer path for each first transfer path in which the accommodation destination device is defined as the exit to make a relay device that is a transfer source of the information retransfer the information to a relay device that is different from a transfer destination of the information corresponding to the first transfer path in the case where the abnormality has occurred at the relay device that is the transfer destination of the information corresponding to the first transfer path, respectively; allocating identical path identification information to the first transfer paths; allocating to each second transfer path separate path identification information that is different from the path identification information allocated to the first transfer paths; generating for each relay device that is the transfer source, a first rule including the path identification information allocated to the corresponding second transfer path to be given to the information by the relay device that is the transfer source when an abnormality occurs at the relay device that is the transfer destination corresponding to the first transfer path; and transmitting the generated first rule to the corresponding relay device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating an example of a topology/link state management table in the embodiment.

FIG. 6 is a diagram illustrating an example of a subscription management table in the embodiment.

FIG. 7 is a diagram illustrating an example of an application accommodation destination GW management table in the embodiment.

FIG. 9 is a diagram illustrating an example of a detouring label path information table in the embodiment.

FIG. 10 is a diagram illustrating an example of an empty label value management table in the embodiment.

Each of the FIGS. 12A through 12F is a diagram illustrating an example of a main signal transfer table in the embodiment.

Each of the FIGS. 13A through 13F is a diagram illustrating an example of an address solution table for the main signal in the embodiment.

Each of the FIGS. 14A through 14F is a diagram illustrating an example of a log transfer table in the embodiment.

Each of the FIGS. 15A through 15F is a diagram illustrating an example of an address solution table for the log in the embodiment.

Each of the FIGS. 16A through 16C is a diagram illustrating an example of a detouring label value management table in the embodiment.

Each of the FIGS. 17A through 17F is a diagram illustrating an example of a distinction table in the embodiment.

Figure 18:
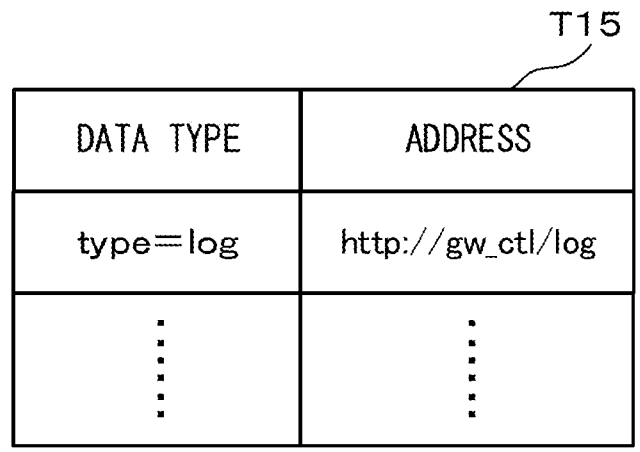

FIG. 18 is a diagram illustrating an example of an application distribution table in the embodiment.

Figure 19:
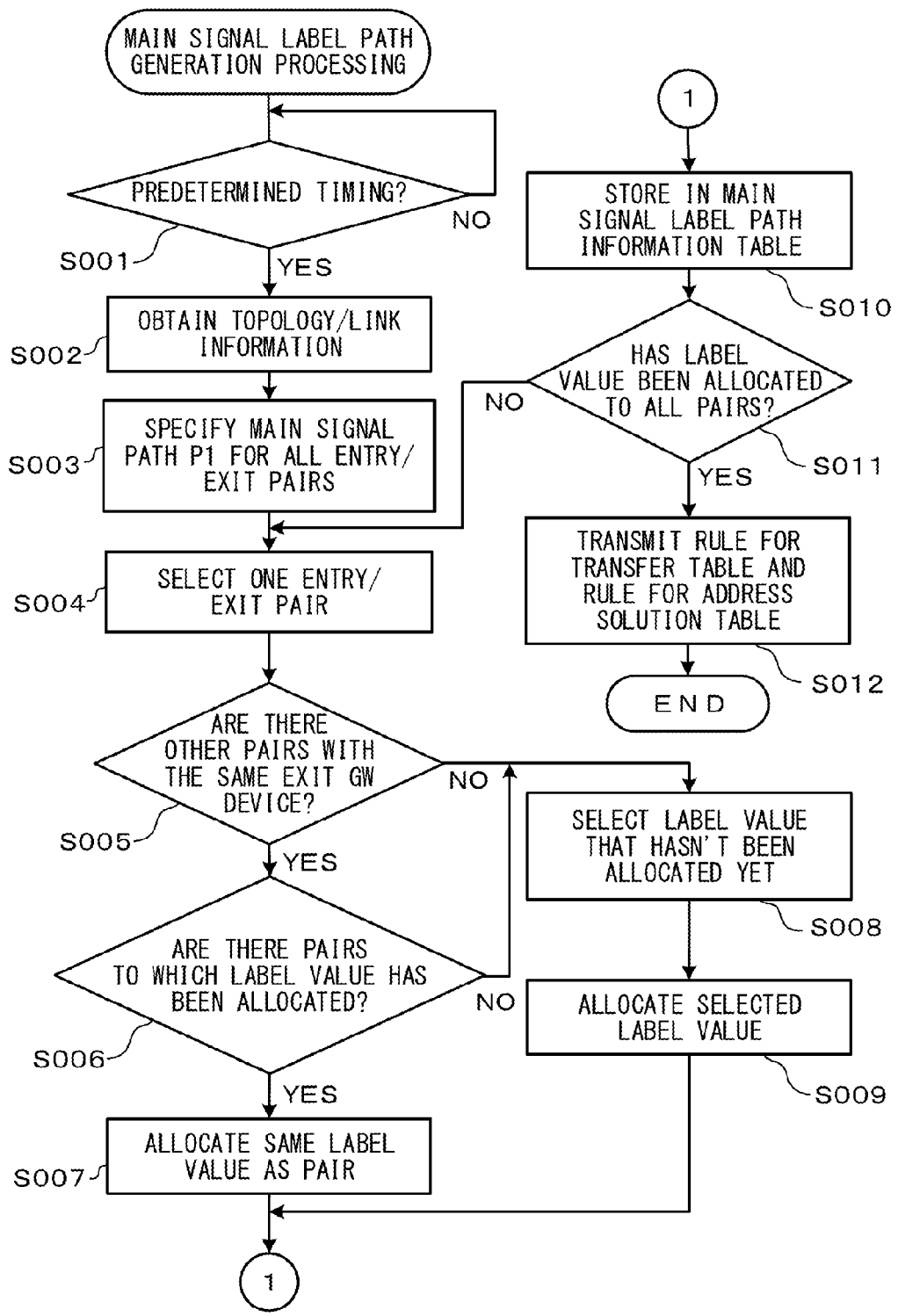

FIG. 19 is an example of a flowchart explaining a processing flow for generating the main signal label path in the embodiment.

Figure 20:
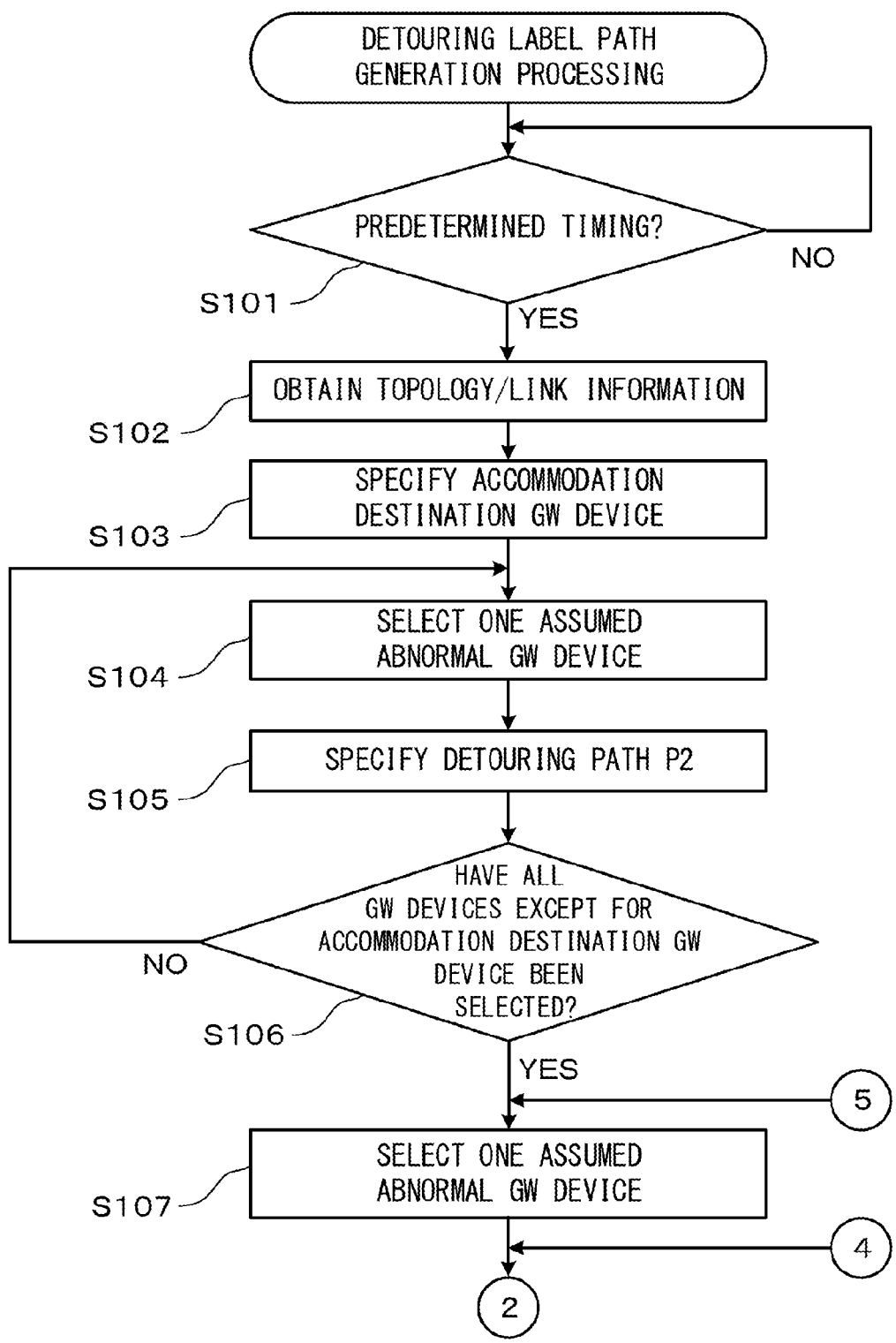

FIG. 20 is a first portion of an example of a flowchart explaining a processing flow for generating the detouring label path.

Figure 21:
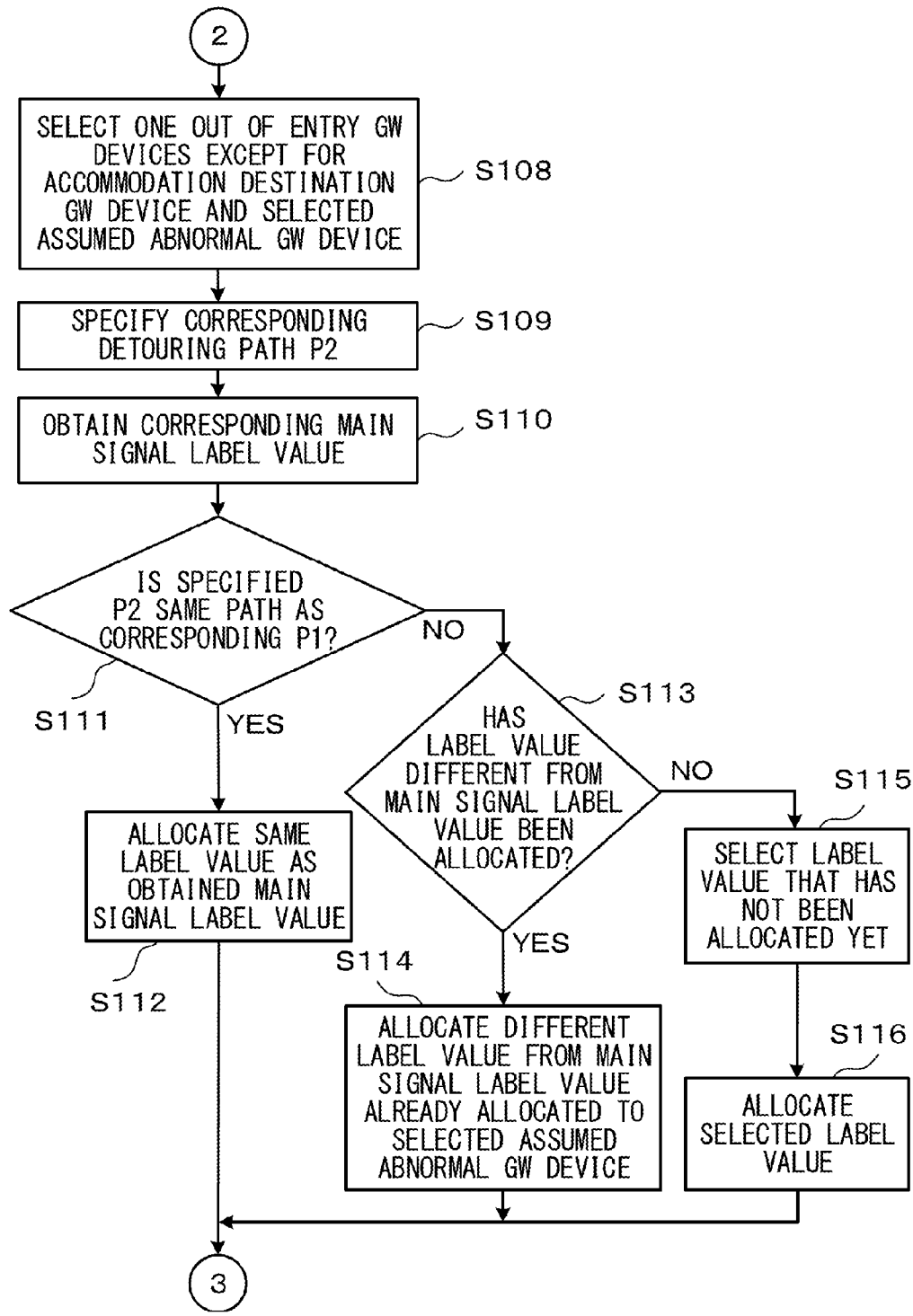

FIG. 21 is a second portion of the example of the flowchart explaining the processing flow for generating the detouring label path.

Figure 22:
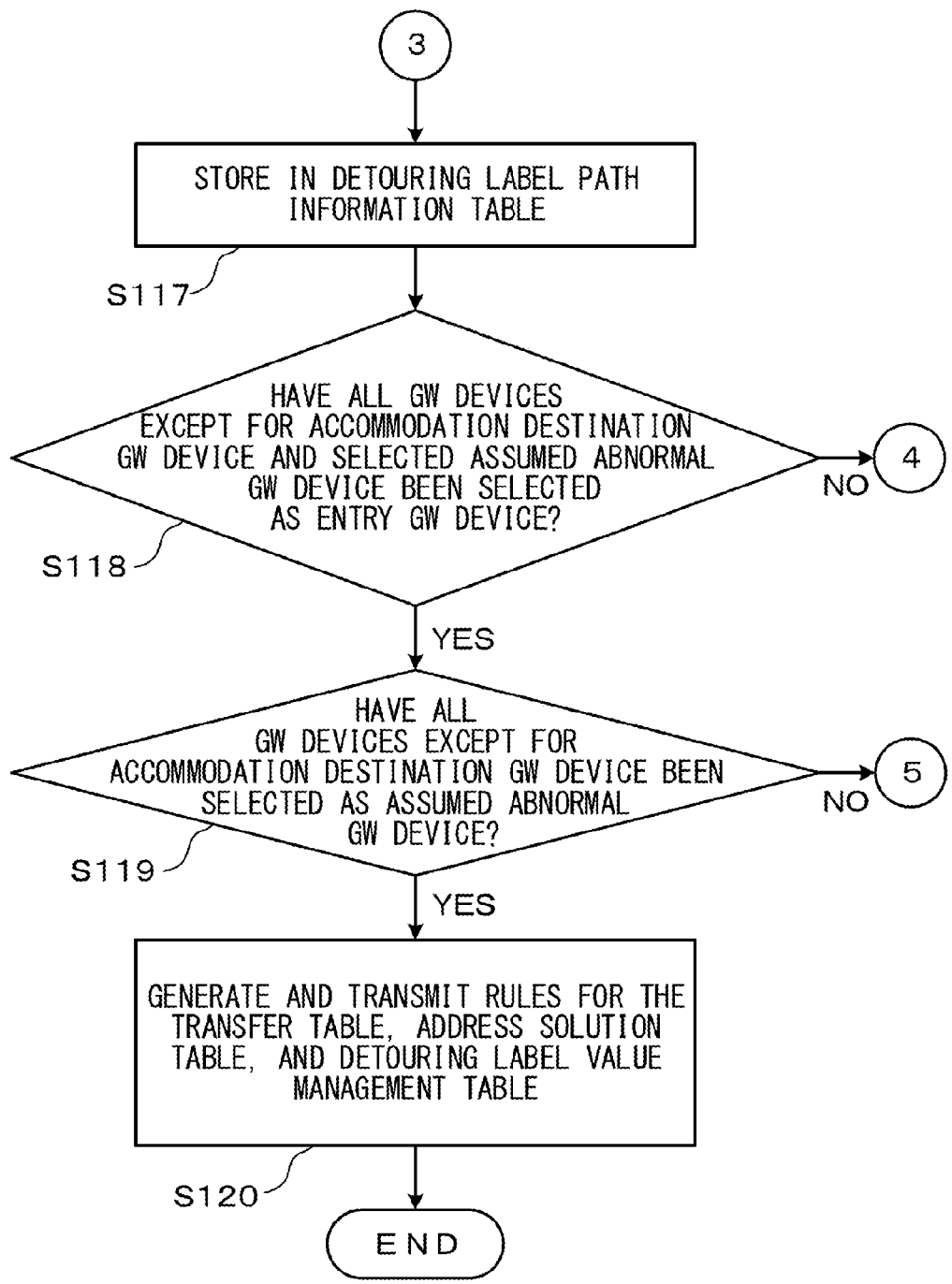

FIG. 22 is a third portion of the example of the flowchart explaining the processing flow for generating the detouring label path.

Figure 23:
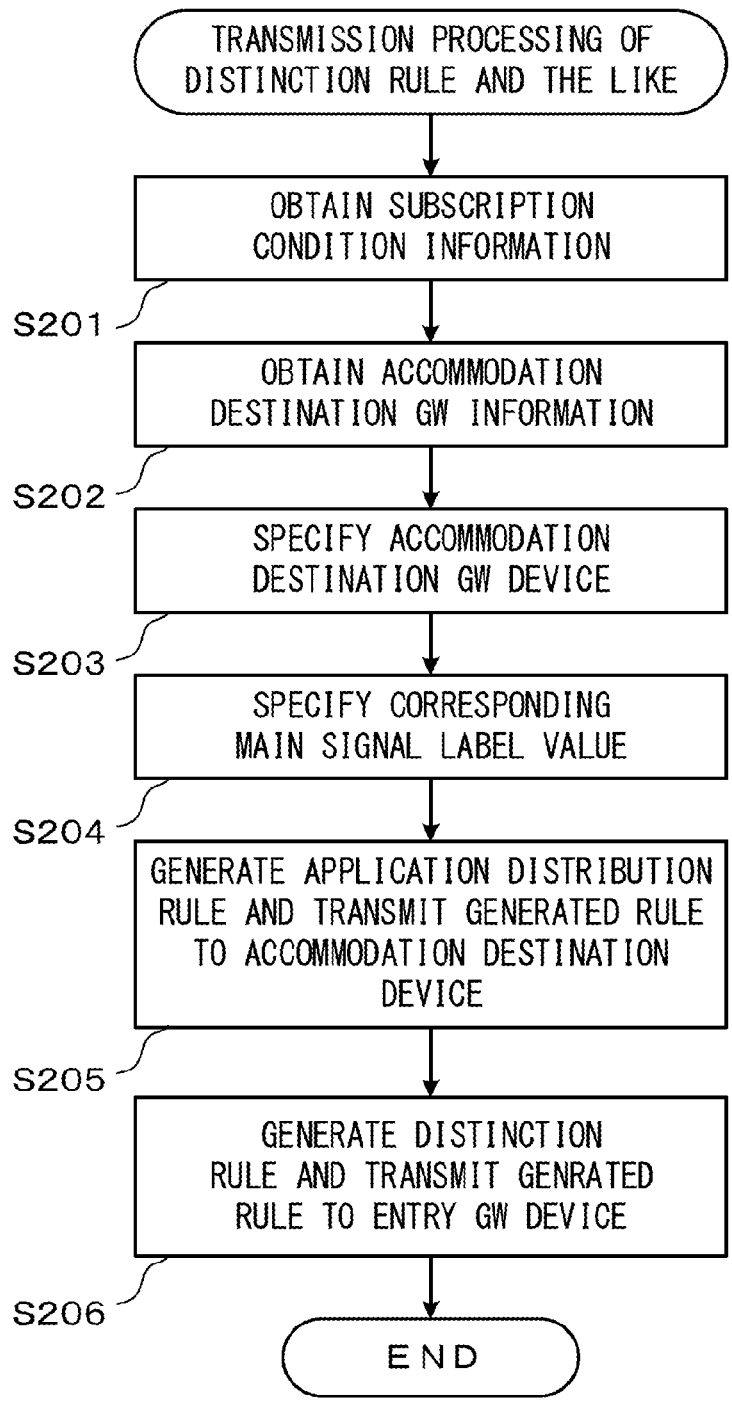

FIG. 23 is an example of a flowchart explaining a flow of transmission processing such as a distinction rule in the embodiment.

FIG. 24 is a portion of an example of a flowchart explaining a flow of a log transfer processing in the embodiment.

Figure 25:
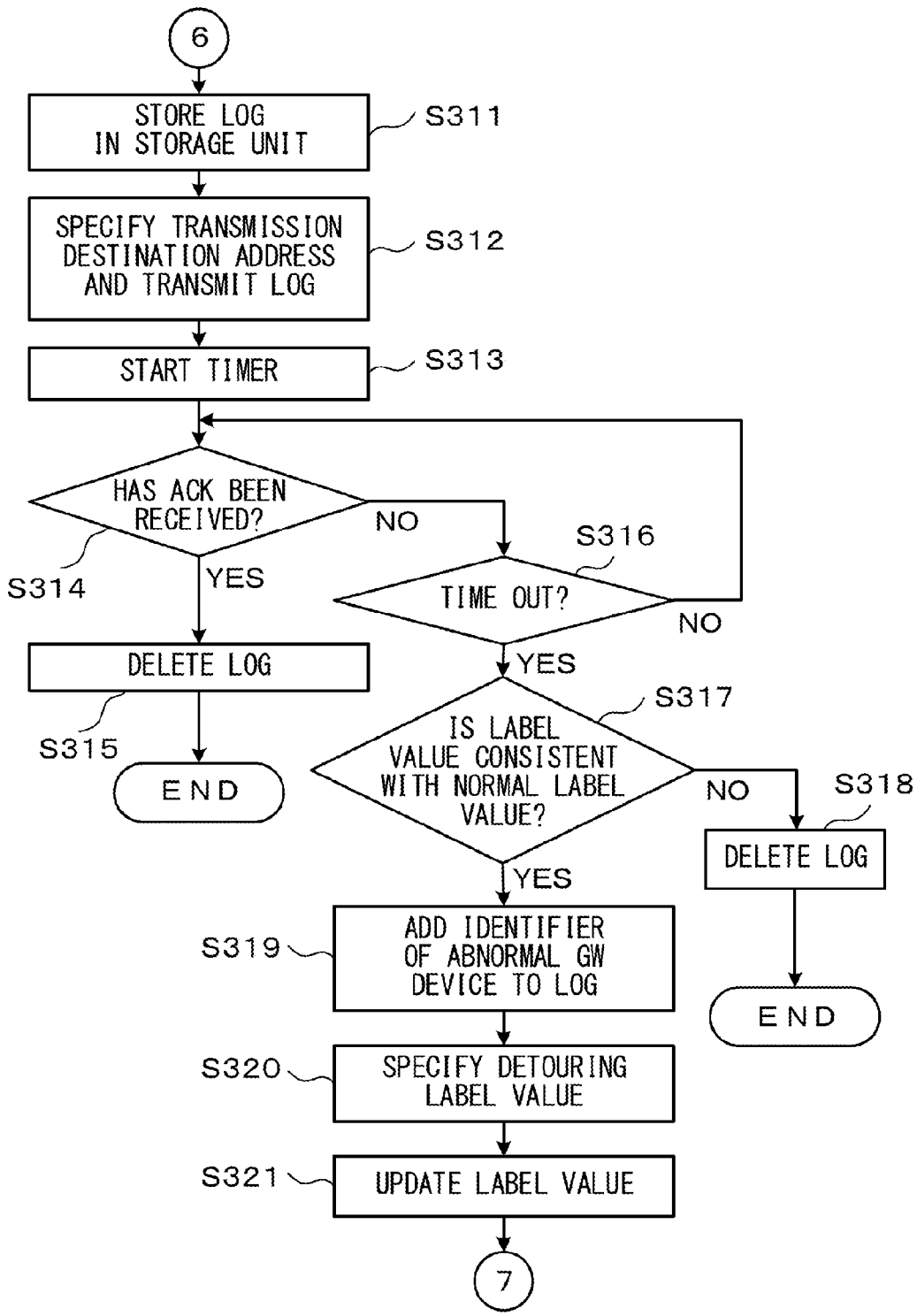

FIG. 25 is another portion of the example of the flowchart explaining the flow of the log transfer processing of the embodiment.

Figure 26:
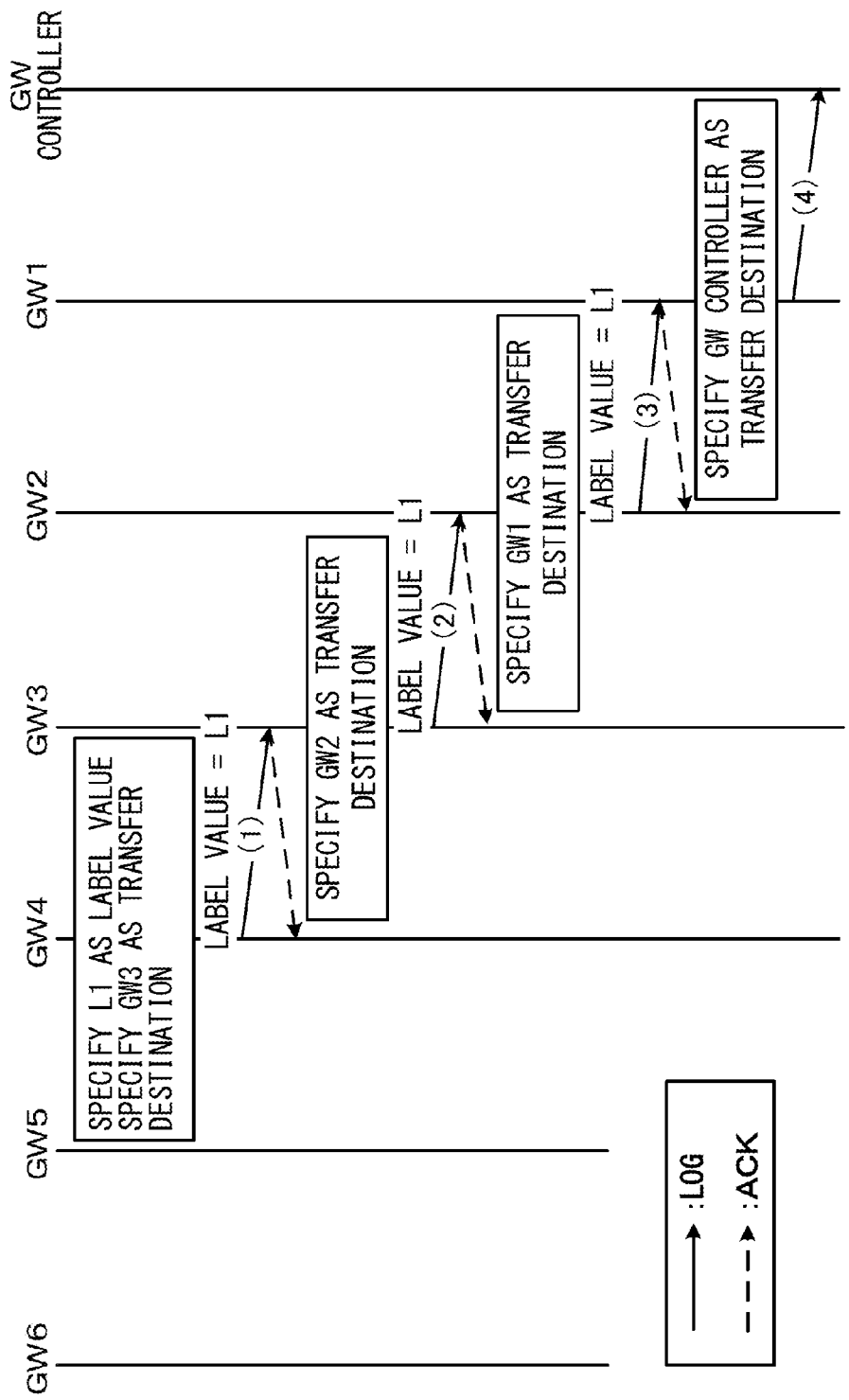

FIG. 26 is a concrete example illustrating a flow of a normal log transfer processing in the network system in the embodiment.

FIG. 27 is a concrete example illustrating a flow of an abnormal log transfer processing in the network system of the embodiment.

FIG. 28 is a diagram illustrating another example of the detouring label path information table in the embodiment.

Figure 29:
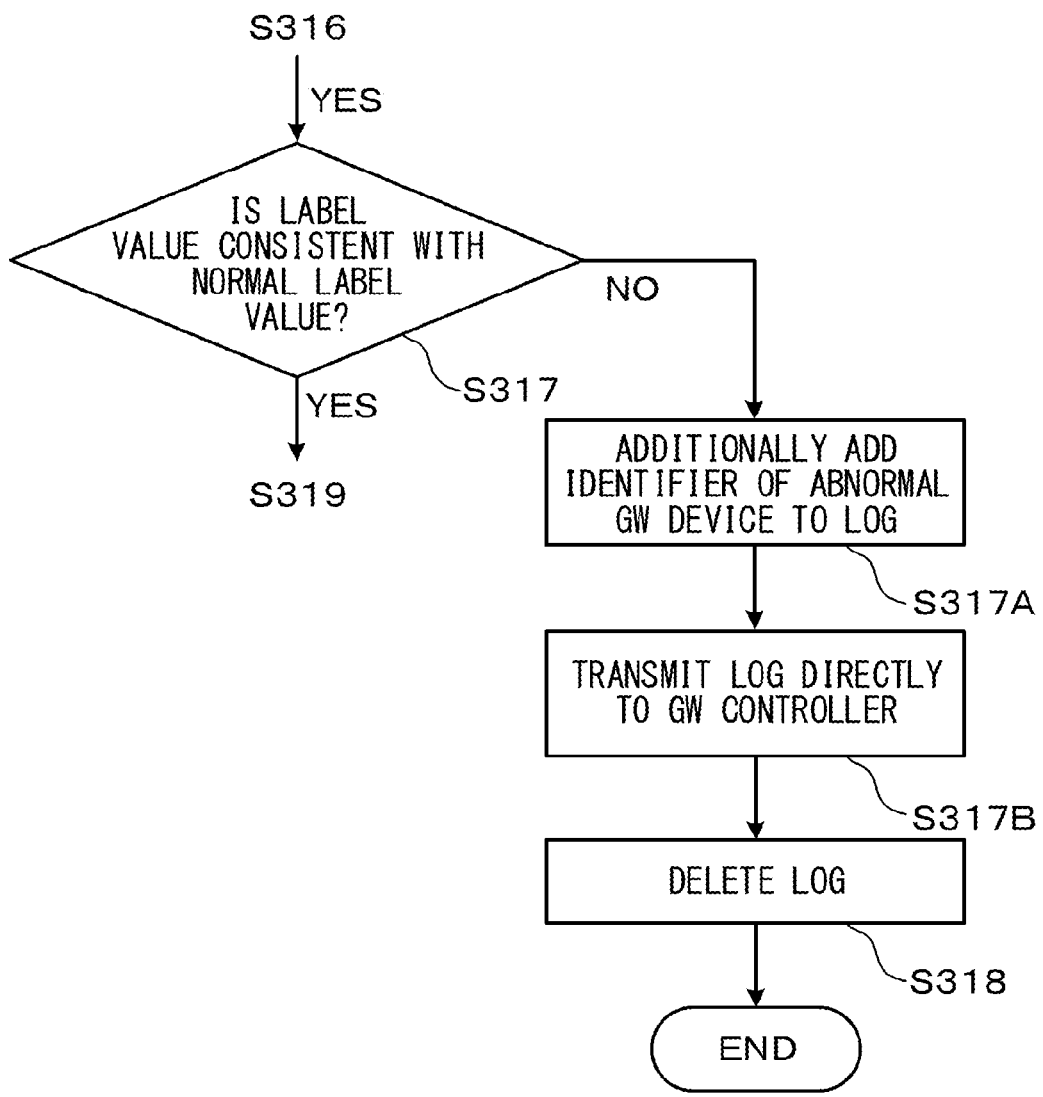

FIG. 29 is another portion of the flowchart explaining the flow of the log transfer processing in the embodiment.

Figure 30:
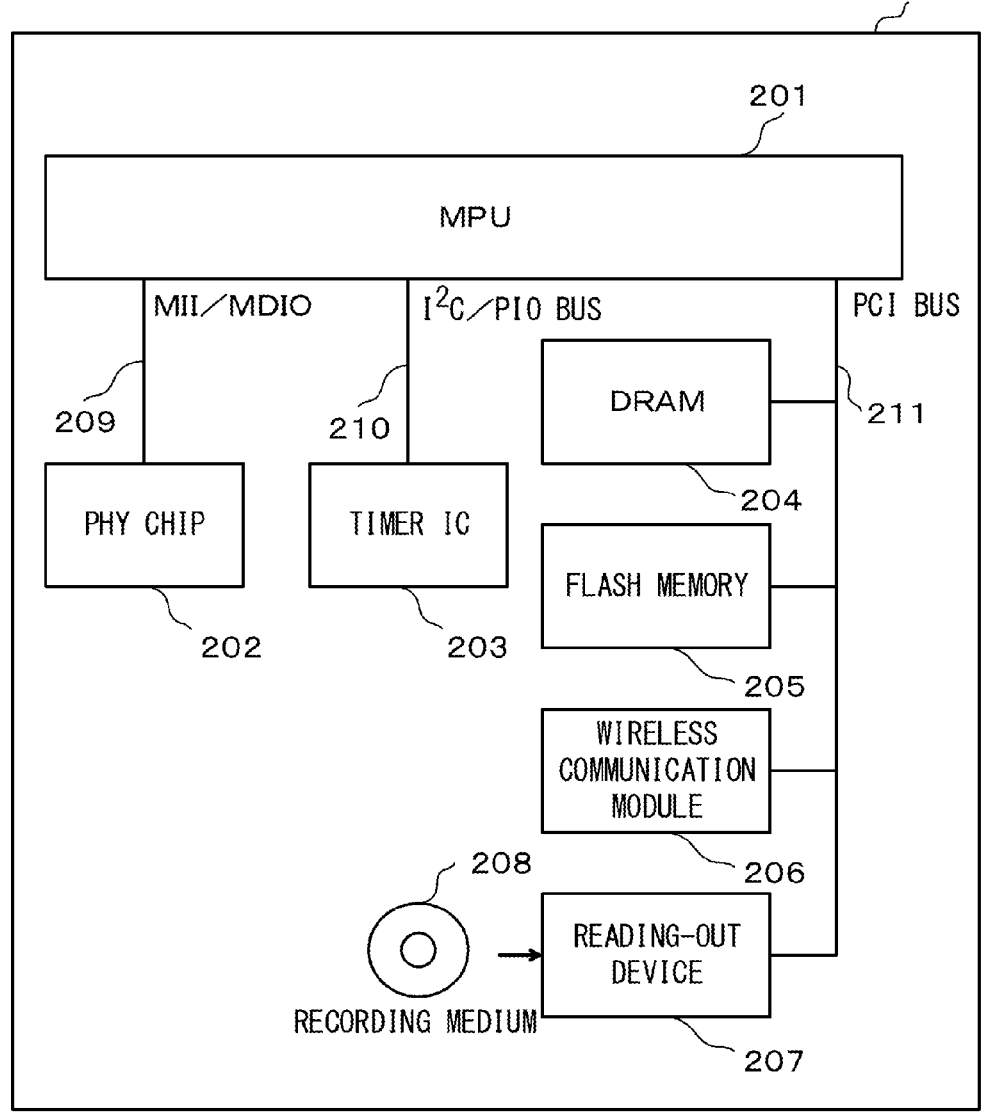

FIG. 30 is a diagram illustrating an example of a hardware configuration of a GW controller and a gateway device in the embodiment.

DESCRIPTION OF EMBODIMENTS

Embodiments of the present invention will be described below in detail with reference to the drawings.

Figure 1:
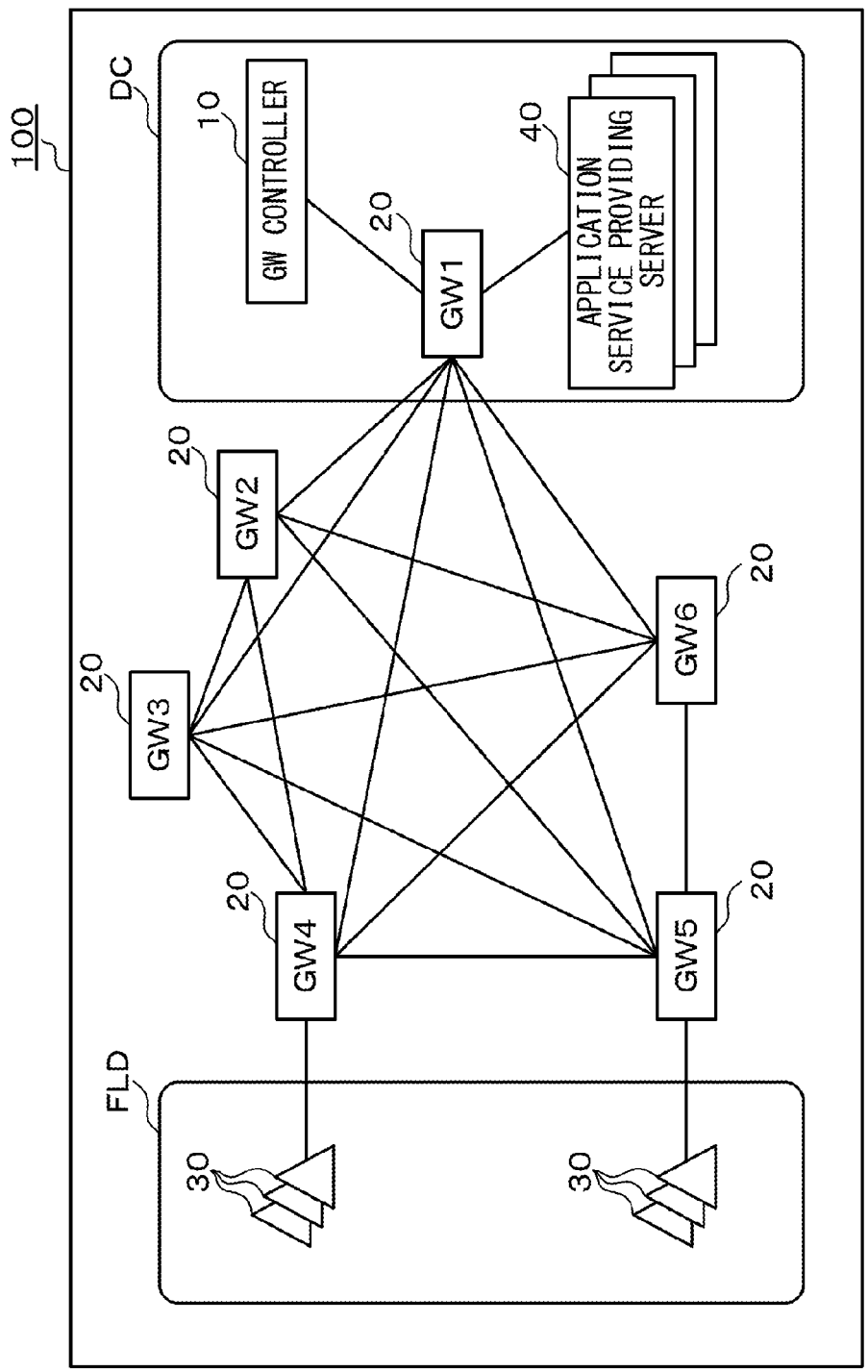
FIG. 1 is a diagram illustrating a configuration example of a network system in the embodiment.

First, referring to FIG. 1, a network system 100 in the embodiment is described. FIG. 1 is a diagram illustrating an example of a configuration of a network system 100 in the embodiment.

The network system 100 is an example of an overlay network system for maintaining an optimal path in response to a link state such as a delay between gateway devices (hereinafter, GW devices) 20 configuring the system. As illustrated in FIG. 1, the network system 100 includes a data transfer control device (hereinafter, GW controller) 10, a plurality of the GW devices 20, a plurality of apparatuses 30, and a plurality of application service providing servers (hereinafter, SA servers) 40. Note that in the following, when indicating a specific GW device 20, a uniquely identifiable identifier (for example, a device ID (IDentification)) GWk (k=1, 2, . . . ) is added to the GW device and is referred to as GW device GW1, for example.

Between the devices constituting the network system 100, links exist which are represented in FIG. 1 by a solid line.

Here, links are logical links such as pseudo-connections of TCP connections or UDP connections. The links may also be formed on a one-hop physical line such as a wireless line or a wired line and may also exist via one or more routers.

For example, referring to FIG. 1, when a GW device GW1 and a GW device GW2 are able to communicate directly without passing through the relay via the other GW device 20, then it is said that "a link exists between the GW device GW1 and the GW device GW2". The GW device GW1 and the GW device GW2 perform data communication via this link. The load and the state of the link changes dynamically. For example, if the device such as the GW device 20 is mobile, the paths that constitutes the IP path between the GW devices 20 changes, because of a variation in distance between the devices. As a result, the delay time of the communication via the links may change. Also, for example, as a result of a failure such as the cable being cut following an earthquake, communication through a specific link may not be possible. Also, for example, as a result of users on the internet viewing videos, a specific band between the routers may be exhausted and the delay time (the transmission waiting time by the GW device or the router) of data transfer via the connection through those routers may be significantly increased.

The apparatus 30 is installed in the field FLD, for example, and collects information from sensors such as electric power meters and transmits the collected information. The SA server 40 is installed in the data center DC and is a device that analyses the information collected from the apparatus 30 and provides the analysis results.

Figure 2:
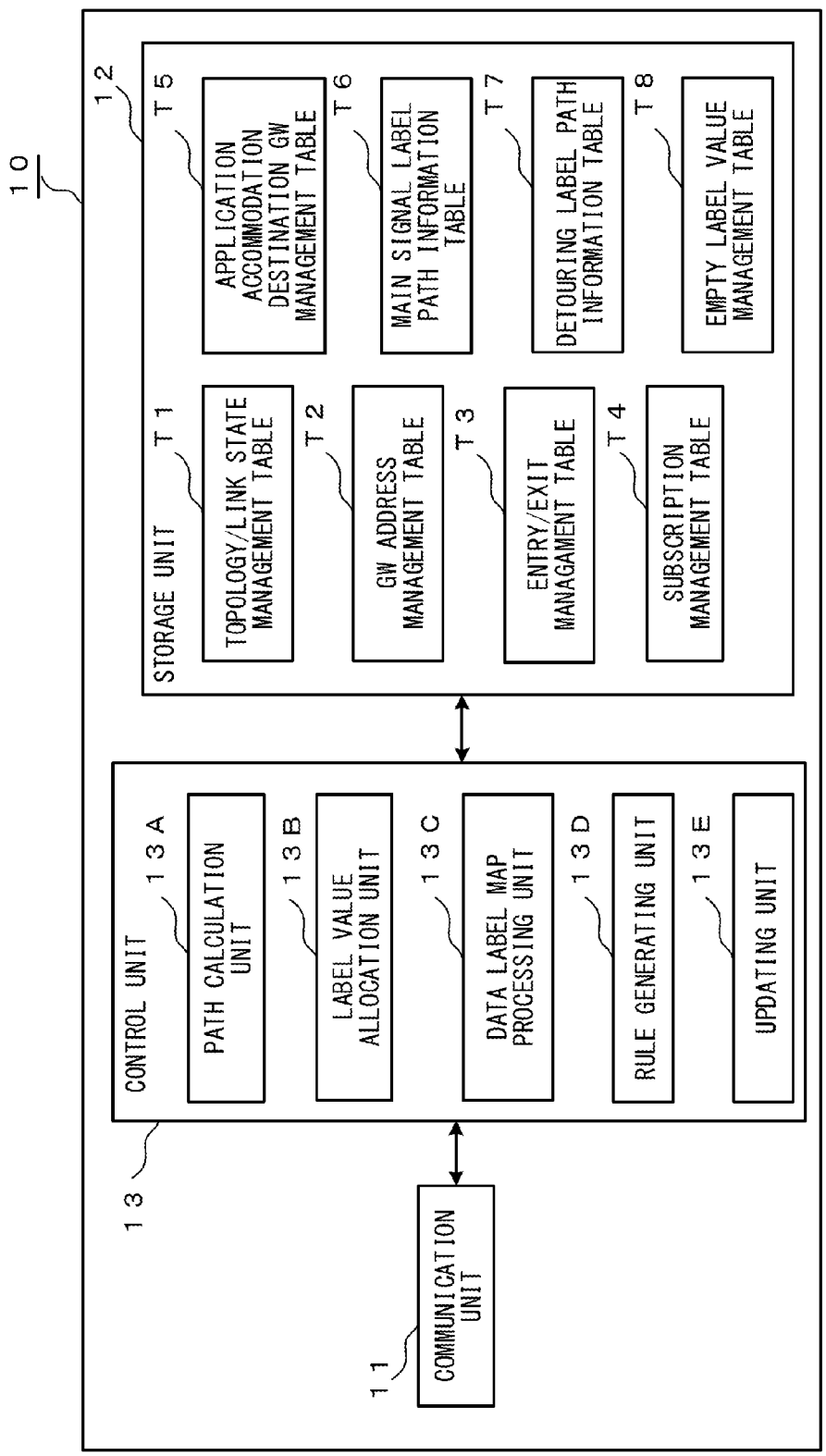
FIG. 2 is a functional block diagram illustrating a configuration example of a GW controller constituting the network system in the embodiment.

FIG. 2 is a functional block diagram illustrating a configuration example of a GW controller 10 constituting the network system 100 in this embodiment.

The GW controller 10 is a data transfer control device for controlling the data transfer of the GW device 20 constituting the network system 100, and as illustrated in FIG. 2, the GW controller 10 is provided with a communication unit 11, a storage unit 12, and a control unit 13.

The communication unit 11 is, for example, provided with a communication module etc. and facilitates communication between each of the GW devices 20. For example, the communication unit 11 transmits transfer rules (to be described in detail later) that specify the GW device 20 that is transfer destination of data (hereinafter, transfer destination GW device 20) to each GW device 20.

The storage unit 12, for example, is provided with a Random Access Memory (RAM), a Read Only Memory (ROM), and a flash memory and the like. The storage unit 12 functions as a working area of a Micro-Processing Unit (MPU) included in the control unit 13, a program area for storing various programs such as operation programs for controlling the entire GW controller 10, and as a data area for storing various data such as a topology/link state management table T1 to be described in detail later.

Referring now to FIGS. 3 through 10, descriptions will be given of tables such as the topology/link state management table T1 stored in the data area of the storage unit 12.

FIG. 3 is a diagram illustrating an example of the topology/link state management table T1 in the present embodiment, and represents its initial state.

The topology/link state management table T1 is managed by an updating unit 13E (to be described in detail later), for example, and is a table that manages the topology indicating the positional relationship of the connections between the GW devices 20 that constitute the network system 100 and manages the delay of each link (hereinafter referred to as the link delay) existing between the GW devices 20. As illustrated in FIG. 3, the topology/link state management table T1 in the present embodiment is a table that associates a link delay (ms) with each link that exists between the GW devices 20. Here, the link delay is, for example, a measurement result of a reciprocating delay between the GW devices 20 constituting the link. The reciprocating delay is, for example, measured by each of the GW devices 20 by using the PING command. Each GW device 20 collects the link state, such as the link delay, and by transmitting the collected link state as a log to the specified transfer destination GW device 20, the link state is delivered to the GW controller 10.

Note that the initial setting of the topology/link state management table T1, for example, may be performed by the administrator of the network system 100, and may be set such that, limited only to the starting operation of the network system 100, each GW device 20 is caused to transmit a log including a measured link delay for example directly to the GW controller 10, and the updating unit 13E of the GW controller 10 initializes the topology/link state management table T1 on the basis of the collected link state.

Figure 4:
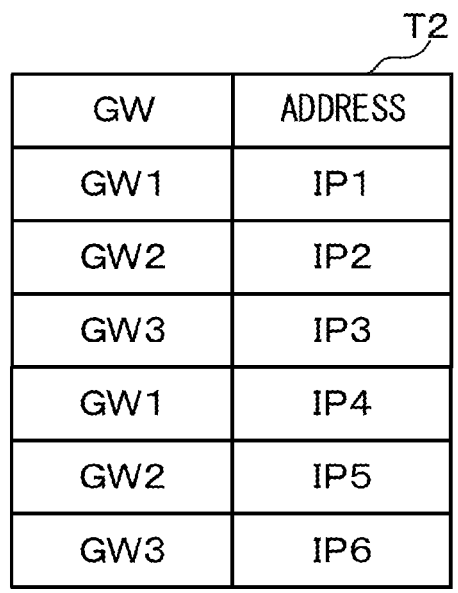
FIG. 4 is a diagram illustrating an example of a GW address management table.

FIG. 4 is a diagram illustrating an example of a GW address management table T2 of the present embodiment. The GW address management table T2 manages the addresses of the GW devices 20 constituting the network system 100, and as illustrated in FIG. 4, is a table in which the identifiers GWk of the GW devices 20 and the Internet Protocol (IP) addresses of the GW devices 20 are associated with each other.

Figure 5:
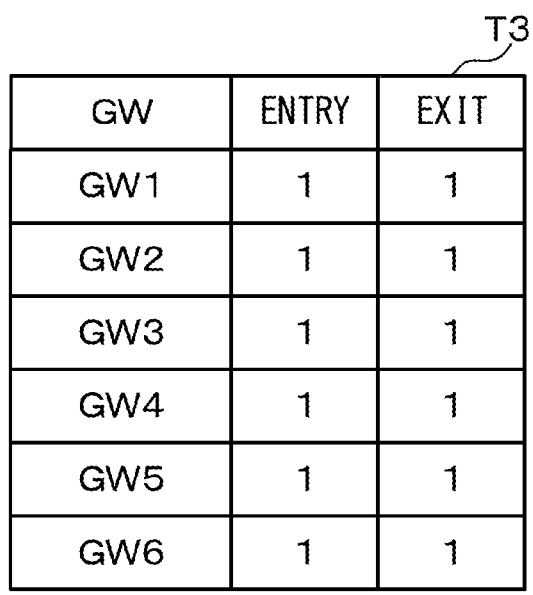
FIG. 5 is a diagram illustrating an example of an entry/exit management table

FIG. 5 is a diagram illustrating an example of an entry/exit management table T3 in the embodiment. The entry/exit management table T3 manages the entry GW device 20 and the exit GW device 20, and as illustrated in FIG. 5, is a table in which the identifiers GWk of the GW devices 20, an entry flag showing whether or not the GW device is the entry GW device 20, and an exit flag showing whether or not the GW device is the exit GW device 20, are associated with each other. In the present embodiment, it is assumed that when the flag value of the entry flag is "1", this indicates that the GW device 20 is the entry GW device 20. Likewise, when the flag value of the exit flag is "1", this indicates that the GW device 20 is the exit GW device 20. That is, in the example of FIG. 5, all the GW devices 20 constituting the network system 100 illustrated in FIG. 1 indicate entry GW devices 20 and exit GW devices 20.

Here, the entry GW device 20, for example, is a GW device 20 receiving first data from the apparatus 30 and is also, for example, a log generating source. That is, in this embodiment, all the GW devices 20 are assumed to function as an entry GW device 20. The exit GW device 20, for example, is a GW device 20 installed immediately in front of the apparatus 30 or the SA server 40.

FIG. 6 is a diagram illustrating an example of a subscription management table T4 in the present embodiment. The subscription management table T4 manages a type of data (hereinafter, the data type) that each of the GW controller 10 and the SA server 40 targets and collects, and manages the destination address of the data belonging to that data type. The subscription management table T4 is set in advance by the administrator.

As illustrated in FIG. 6, the subscription management table T4 is a table in which an application ID, the data type, and addresses are associated with each other. The application ID is an identifier that is uniquely identifiable with the GW controller 10 (or, the SA server 40) that collects the data and is, for example, a device ID. The address is Uniform Resource Locator (URL) of transfer destination of the data that is targeted and collected by the GW controller 10 (or, the SA server 40).

The "gw_ctl", "type=log", and "http://gw_ctl/log" in FIG. 6 respectively indicate the device ID of the GW controller 10, the data targeted and collected by the controller 10 GW is a log, and URL for the log.

FIG. 7 is a diagram illustrating an example of the application accommodation destination GW management table T5 of the present embodiment. The application accommodation destination GW management table T5 manages the accommodation destination GW device 20, which is a GW device 20 installed right in front of the GW controller 10 or the SA server 40, and as illustrated in FIG. 7, is a table in which the application ID and the identifier GWk of the accommodation destination GW device 20 are associated with each other. The example in FIG. 7 indicates that the GW device GW1 is the accommodation destination GW device 20 of the GW controller 10.

Figure 8:
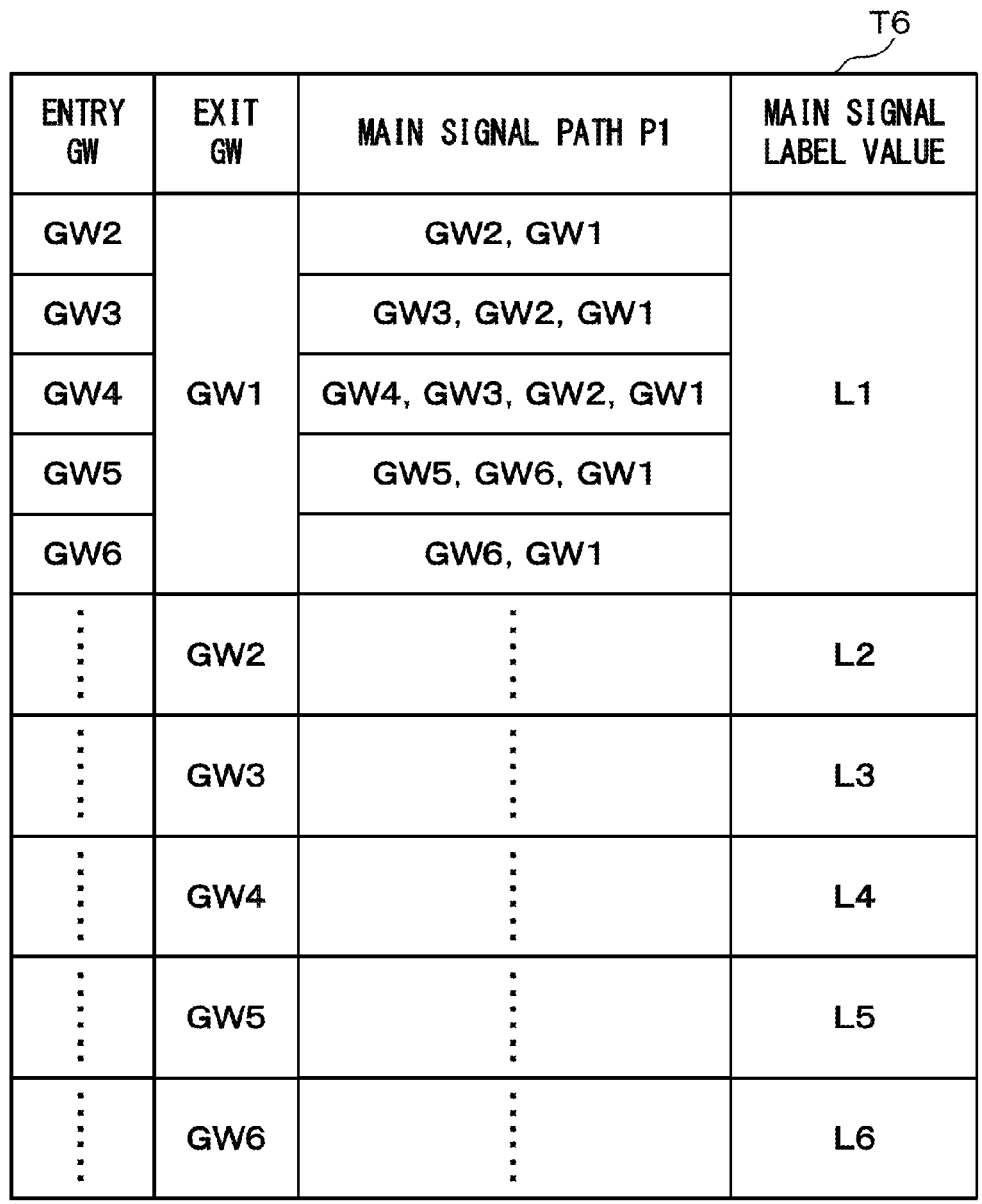
FIG. 8 is a diagram illustrating an example of a main signal label path information table in the embodiment.

FIG. 8 is a diagram illustrating an example of a main signal label path information table T6 in the present embodiment. The main signal label path information table T6 is managed by a path calculation unit 13A (to be described later in detail) and a label value allocation unit 13B (to be described later in detail) and is a table that manages the optimal path for a main signal for each pair of the entry GW device 20 and the exit GW device 20 (hereinafter, entry/exit pair).

The main signal label path information table T6, as illustrated in FIG. 8, is a table in which a main signal path P1 and the main signal label value are associated with each other for each entry/exit pair.

The main signal is generated when providing an application service and is data (a signal) transmitted by the apparatus 30 or the SA server 40. The main signal, for example, is data of information obtained from sensors by the apparatus 30.

The main signal path P1 is the optimal path for the main signal calculated by the path calculation unit 13A on the basis of parameters, such as the link delay, fluctuation, and bandwidth, and, as will be described later in detail, is also used as the path for the log in the normal state.

For example, referring to FIG. 8, the optimal path (main signal path P1) in the entry/exit pair of the entry GW device GW4 and the exit GW device GW1 indicates that it is a path via the GW device 20 in the order of GW device GW4, GW device GW3, GW device GW2, and GW device GW1. In the following, a path will be represented in the following manner: path {GW4, GW3, GW2, GW1}. Path {GW4, GW3, GW2, GW1} is a path via the GW device 20 in the order of GW device GW4, GW device GW3, GW device GW2, and GW device GW1.

The main signal label value is a label value of the main signal path P1 allocated by the label value allocation unit 13B. In this embodiment, as illustrated in FIG. 8, it is assumed that the label value is allocated to each exit unit 20 GW. By doing so, reduction of memory resources and cost reduction of the GW device 20 is achieved. In the following, a path that a label value has been allocated will be referred to as the label path.

FIG. 9 is a diagram illustrating an example of a detouring label path information table T7 in the present embodiment. The detouring label path information table T7 is managed by the path calculation unit 13A and the label value allocation unit 13B, and is a table that assumes that one of the GW devices 20 other than the accommodation destination GW device 20 of the GW controller 10 cannot transfer data due to an abnormality such as a failure, in which case the detouring label path information table T7 manages an optimal path as a detouring path (hereinafter, detouring path) P2 for the log. In the following, the GW device 20 that cannot transfer data due to an abnormality will be referred to as an abnormal GW device 20. The GW device 20 assumed to be the abnormal GW device 20 will be referred to as the assumed abnormal GW device 20.

The detouring label path information table T7, as illustrated in FIG. 9, is a table in which the main signal label value, the identifier GWk of the assumed abnormal GW device 20, the detouring path P2 in such case, and the detouring label value for each entry/exit pair are associated with each other.

The main signal label values, as illustrated in FIG. 9, all have the same values, since only the GW device GW1 is the exit GW device 20 of the entry/exit pair that is managed by the detouring label path information table T7. This is because, as described above, since the accommodation destination GW device 20 of the GW controller 10 that collects the log is the GW device GW1, only the GW device GW1 need be considered as the exit GW device 20 in the detouring label path information table T7.

The assumed abnormal GW device 20, as described above, is a GW device 20 in which the occurrence of an abnormality is assumed. In the present embodiment, the GW devices 20 other than the entry GW device 20 and the exit GW device 20 are the assumed abnormal GW devices 20. This is because, since the GW device GW1, which is the accommodation destination GW device 20 of the GW controller 10, as illustrated in FIG. 1, is installed in the data center DC and is usually redundant, there is no need to consider the abnormality of the GW device GW1 (the accommodation destination GW device GW2 of the GW controller 10).

In addition, only a relay GW device 20 in each main signal path P1 of the entry/exit pair managed by the detouring label path information table T7 may be made to be the assumed abnormal GW device 20. By doing so, the main signal paths P1 unaffected when an abnormality actually occurs are removed, thereby making it possible to reduce the number of entries and to effectively utilize the memory resources.

The relay GW device 20, here, is a GW device 20 on a path other than the entry GW device 20 and the exit GW device 20, and referring to FIG. 8, for example, the relay device 20 of the main signal path P1 corresponding to the entry/exit pair of the entry GW device GW4 and the exit GW device GW1 is the GW device GW3 and the GW device GW2.

The detouring path P2 is a detouring path for the log when an abnormality actually does occur in the assumed abnormal GW device 20, and assuming that an abnormality has occurred in the assumed abnormal GW device 20, the detouring path P2 is calculated by the path calculation unit 13A on the basis of only the link delay.

For example, in the case in which the assumed abnormal GW device 20 is the GW device GW2, the detouring path P2 in the entry/exit pair of the entry GW device GW3 and the exit GW device GW1 is the path {GW3, GW4, GW6, GW1}. The method for specifying the detouring path P2 will be described in detail later.

The detouring label value is a label value allocated to each detouring path P2 by the label value allocation unit 13B, and a label value different from the main signal label value is allocated as a detouring label value, when the relay GW device 20 of the main signal path P1 used in the normal state has become the assumed abnormal GW device 20.

For example, referring to FIG. 9, in the case in which the assumed abnormal GW device 20 is the GW device GW2, a label value L7 different from the main signal label value L1 will be allocated as the detouring label value of the detouring path P2 in the entry/exit pair of the entry GW device GW3 and the exit GW device GW1. As another example, in the case in which the assumed abnormal GW device 20 is the GW device GW2, a label value L1 identical to the main signal label value will be allocated as the detouring label value of the detouring path P2 in the entry/exit pair of the entry GW device GW5 and the exit GW device GW1. This is because, even when an abnormality actually does occur in the assumed abnormal GW device GW2, this will not affect the log transmission since the GW device GW2 is not on the path of the main signal path P1.

FIG. 10 is a diagram illustrating an example of an empty label value management table T8 in this embodiment. The empty label value management table T8 is managed by the label value allocation unit 13B and manages a label value that is not allocated (hereinafter referred to as empty label value) and, as illustrated in FIG. 10, is a table in which each label value is associated with an in-use flag.

The in-use flag is a flag indicating whether the corresponding label value is an empty label value or not. In the present embodiment, it is assumed that the flag value "1" indicates that a label value is in use and that the flag value "0" indicates that a label value is an empty label value.

Returning to FIG. 2, the control unit 13, for example, includes the MPU etc. and executes the operation program stored in the program area of the storage unit 12, and, as illustrated in FIG. 2, carries out the functions of the path calculation unit 13A, the label value allocation unit 13B, a data label MAP processing unit 13C, a rule generating unit 13D, and the updating unit 13E. In addition, the control unit executes an operation program and executes control processing for controlling the entire GW controller 10 and processing such as the main signal label path generation processing to be described in detail later.

The path calculation unit 13A specifies the main signal path P1. More specifically, the path calculation unit 13A, at a predetermined timing, referring to the topology/link state management table T1, obtains information of the topology of the GW device 20 constituting the network system 100 and a link delay between the GW devices 20 where a link exist (hereinafter referred to as topology/link information).

At this time, the path calculation unit 13A obtains other parameters, such as fluctuations and bandwidth, as necessary.

Then, the path calculation unit 13A, by referring to the entry/exit management table T3, specifies all the entry/exit pairs on the basis of the topology/link information and calculates the main signal path P1 for all the entry/exit pairs that have been specified. Then, the path calculation unit 13A associates the specified main signal paths P1 with entry/exit pair and stores them in the main signal label path information table T6.

Here, a starting time of the operation of the network system 100, a topology changing time such as adding or removing of the GW device 20 by the administrator, an abnormality detection time of the GW device 20 by the GW controller 10, and a detection time in a change of a link delay by the GW controller 10, are assumed as the predetermined timing.

In addition, the path calculation unit 13A specifies the detouring path P2. More specifically, the path calculation unit 13A, at a predetermined timing, referring to the topology/link state management table T1, obtains topology/link information. Then, the path calculation unit 13A, referring to the application accommodation destination GW management table T5, specifies the accommodation destination GW device 20 of its GW controller 10 and selects as the assumed abnormal GW device 20 an unselected GW device 20 from among the GW devices 20, excluding the specified accommodation destination GW device 20.

Then, the path calculation unit 13A, referring to the entry/exit management table T3, in the case where the selected assumed abnormal GW device 20 does not exist in the topology, specifies all the entry/exit pairs that set the specified accommodation destination GW device 20 to the exit GW device 20. Then, the path calculation unit 13A, from among the main signal paths P1 corresponding to all the entry/exit pairs that have been specified, specifies the main signal paths P1 which are not affected even if an abnormality occurs in the selected assumed abnormal GW device 20, and specifies the specified main signal paths P1 as the detouring path P2. On the other hand, with regard to the main signal path P1 that is affected, that is, the main signal path P1 where the selected assumed abnormal GW device 20 exists on its path, the detouring path P2 is specified, by calculating the optimal path (minimum link delay path) from the GW device 20 right in front of the selected assumed abnormal GW device 20 to the exit GW device 20 (the specified accommodation destination GW device 20) on the basis of the obtained topology/link information. Then, the path calculation unit 13A associates the specified detouring paths P2 with entry/exit pair and stores them in the detouring label path information table T7.

For example, referring to FIGS. 3, 8 and 9, when the GW device GW2 is the assumed abnormal GW device 20, the main signal path P1 corresponding to the entry/exit pair of the entry GW device GW4 and the exit GW device GW1 is the path {GW4, GW3, GW2, GW1}, and the assumed abnormal GW device GW2 is present on the path.

Therefore, the path calculation unit 13A obtains the path {GW4, GW3, GW4, GW6, GW1} by calculating the optimal path (minimum link delay path) from the GW device GW3 right in front of the selected assumed abnormal GW device 20 to the exit GW device GW1, and specifies the path {GW4, GW3, GW4, GW6, GW1} as the detouring path P2.

Here, the reason for calculating the detouring path P2 on the basis of only the topology/link information (link delay) is that the detouring path P2 is a path for the log and the log only needs to be delivered to the GW controller 10 within a predetermined delay time. The predetermined timing to calculate a detouring path P2 is basically the same as the predetermined timing in the main signal path P1.

However, before calculating the detouring path P2, the main signal path P1 is calculated. At the abnormality detection time of the GW device 20 by the GW controller 10 and the detection time of a change in a link delay by the GW controller 10, the calculation frequency of the detouring path P2 may be less than the calculation frequency of the main signal path P1. That is, at the abnormality detection time of the GW device 20 by the GW controller 10 and the detection time of a change in a link delay by the GW controller 10, there is no need to calculate the detouring path P2 each time. This is because the detouring path P2 is prepared in advance for the log.

The label value allocation unit 13B allocates a label value to the main signal path P1 specified by the path calculation unit 13A. More specifically, the label value allocation unit 13B, referring to the main signal label path information table T6, selects one unselected entry/exit pair and determines whether there are other entry/exit pairs having the same exit GW device 20 as the selected entry/exit pair by searching the main signal label path information table T6 using the identifier GWk of the exit GW device 20 as a key.

In the case when there are other entry/exit pairs having the same exit GW device 20 as the selected entry/exit pair, the label value allocation unit 13B further determines whether there are entry/exit pairs in which a label value has already been allocated to the corresponding main signal path P1 among the other entry/exit pairs having the same exit GW device 20 as the selected entry/exit pair by searching the main signal label path information table T6 using the main signal label value as a key.

When there are entry/exit pairs to which the label value has already been allocated, the label value allocation unit 13B allocates as a main signal label value the same label value as the entry/exit pair to the main signal path P1 of the selected entry/exit pair.

On the other hand, when there are no other entry/exit pairs having the same exit GW device 20 as the selected entry/exit pair, or if there are other entry/exit pairs having the same exit GW device 20 as the selected entry/exit pair, but there are no entry/exit pairs to which the label value has already been allocated among them, the label value allocation unit 13B, referring to the empty label value management table T8, selects one unallocated label value and sets the in-use flag corresponding to the selected label value to "1". Then, the label value allocation unit 13B allocates the selected label value as the main signal label value to the main signal path P1 of the selected entry/exit pair.

Then, the label value allocation unit 13B stores the allocated main signal label value in the selected main signal label value path information table T6 in association with the main signal path P1 of the entry/exit pairs.

In addition, the label value allocation unit 13B allocates the label value to the detouring path P2 specified by the path calculation unit 13A. More specifically, the label value allocation unit 13B, referring to the detouring label path information table T7, selects one assumed abnormal GW device 20 and selects one of the entry GW devices 20 corresponding to the selected assumed abnormal GW device 20. That is, the label value allocation unit 13B selects one of the entry GW devices 20, excluding the accommodation destination GW device 20 of its own GW controller 10 and the selected assumed abnormal GW device 20.

Then, the label value allocation unit 13B, referring to the detouring label path information table T7, specifies the corresponding detouring path P2 and obtains the corresponding main signal label value. Then, the label value allocation unit 13B, referring to the detouring label path information table T7 and the main signal label path information table T6, determines whether the specified detouring path P2 and the corresponding main signal path P1 are the same path.

When the specified detouring path P2 and the corresponding main signal path P1 are the same path, the label value allocation unit 13B allocates as the detouring label value the same label value as the obtained main signal label value to the specified detouring path P2.

On the other hand, when the specified detouring path P2 and the corresponding main signal path P1 are not the same path, the label value allocation unit 13B, referring to the detouring label path information table T7, further determines whether there are entry GW devices 20 to which label value different from the main signal label value have been allocated from among the entry GW devices 20 other than the selected entry GW devices 20 corresponding to the selected assumed abnormal GW devices 20.

When there are entry GW devices 20 to which label value different from the main signal label value have been allocated as the detouring label value, the label value allocation unit 13B allocates label value different from the main signal label value as the detouring label value to the specified detouring path P2.

On the other hand, when there are no entry GW devices 20 to which label value different from the main signal label value have been allocated as the detouring label value, the label value allocation unit 13B, referring to the empty label value management table T8, selects one unallocated label value and sets the in-use flag corresponding to the selected label value to "1".

Then, the label value allocation unit 13B allocates the selected label value as the detouring label value to the specified detouring path P2.

Then, the label value allocation unit 13B stores the allocated detouring label value in the detouring label path information table T7 in association with the specified detouring path P2.

The data label MAP processing unit 13C, for example, performs association processing between the data and the label value for each data type of the data that its own GW controller 10 and SA server 40 target and collect. More specifically, the data label MAP processing unit 13C, referring to the subscription management table T4, obtains registered information (hereinafter referred to as subscription condition information) and, referring to the application accommodation destination GW management table T5, obtains the registered information (hereinafter referred to as the accommodation destination GW information).

The data label MAP processing unit 13C specifies each accommodation destination GW device 20 corresponding to each data type on the basis of the obtained subscription condition information and accommodation destination GW information, and, referring to the main signal label path information table T6, specifies for each specified accommodation destination GW device 20, the corresponding main signal label value by using the specified accommodation destination GW device 20 as an entry GW device 20. The data label MAP processing unit 13C, in this way, associates the data and the main signal label value for each data type.

For example, referring to FIGS. 6 and 7, when the data type is the log, the data label MAP processing unit 13C specifies the GW device GW1 as the accommodation destination GW device 20 corresponding to the log. Then, referring to FIG. 8, since the main signal label value is L1 when the GW device GW1 is the exit GW device 20, the data label MAP processing unit 13C specifies L1 as the main signal label value corresponding to the log.

The rule generating unit 13D generates a variety of rules to be distributed to the GW devices 20 and transmits the generated rules to the GW devices 20 which are the distribution target.

For example, the rule generating unit 13D, referring to the main signal label path information table T6, generates a rule for the main signal transfer table for each GW device 20, and transmits the generated rule for the main signal transfer table to the corresponding GW device 20. The rule for the main signal transfer table is a rule that specifies the transfer destination GW device 20 in accordance with the added label value for the GW devices 20 that receive the main signal and includes information associated with the identifier GWk of the transfer destination GW device 20 for each label value allocated to the main signal path P1.

For example, referring to FIG. 8, with regard to the main signal label value L1, GW device GW1 is the exit GW device 20. Therefore, the rule generating unit 13D generates the rule for the main signal transfer table addressed to the GW devices GW1 that the label value L1 is associated with "NULL", for example, which indicates that there is no transfer destination GW device 20. Also, in the main signal path P1 corresponding to the main signal label value L1, the transfer destination GW device 20 of the GW device GW3 is the GW device GW2. Therefore, in the rule for the main signal transfer table addressed to the GW devices GW3, the rule generating unit 13D associates the identifier GW2 with the label value L1.

For example, the rule generating unit 13D, referring to the GW address management table T2, generates for each GW device 20 a rule for the address solution table for the main signal indicating the address of the transfer destination GW device 20 and transmits the generated rule for the address solution table for the main signal to the corresponding GW device 20. More specifically, the rule generating unit 13D, referring to the GW address management table T2, specifies the address of the GW device 20 of the identifier GWk included in the rule for the main signal transfer table generated for each GW device 20 and generates the rule for the address solution table for the main signal including information that associates the specified address and the identifier GWk.

Also, for example, the rule generating unit 13D, referring to the detouring label path information table T7, generates a rule for the log transfer table for each GW device 20 and transmits the generated rule for the log transfer table corresponding to the GW device 20. The rule for the log transfer table is a rule that specifies the transfer destination GW device 20 in accordance with the added label value to GW device 20 which has received the log and includes information that associates the identifier GWk of the transfer destination GW device 20 for each label value added to the received log or that may be added to the log to be transmitted.

For example, referring to FIG. 9, with respect to the log, the GW device GW1 is the accommodation destination GW device 20 (exit GW device 20) and the label values that are added to the log that the GW device GW1 receives, or that may be added to the log to be transmitted by the GW device GW1, are L1 and L7 through L9. Therefore, the rule generating unit 13D generates the rule for the log transfer table addressed to the GW devices GW1 that the label values L1 and L7 through L9 are associated with "NULL", for example, which indicates that there is no transfer destination GW device 20. Also, the label value that is added to the log that the GW device GW4 receives, or that may be added to the log to be transmitted by the GW device GW4 is L1, L7 and L8 and the identifier GWk of the transfer destination GW device 20 corresponding to the respective label values L1, L7 and L8, is GW3, GW6, or GW2. Therefore, in the rule for the transfer table addressed to the GW devices GW4, the rule generating unit 13D associates the identifier GW3, GW6, and GW2 with the label value L1, L7, and L8 respectively.

For example, the rule generating unit 13D, referring to the GW address management table T2, generates for each GW device 20 a rule for the address solution table for the log indicating the address of the transfer destination GW device 20 and transmits the generated rule for the address solution table for the log to the corresponding GW device 20. More specifically, the rule generating unit 13D, referring to the GW address management table T2, specifies the address of the GW device 20 of the identifier GWk included in the rule for the log transfer table generated for each GW device 20 and generates the rule for the address solution table for the log including information that associates the specified address and the identifier GWk.

Also, for example, the rule generating unit 13D generates the rule for the detouring label value management table indicating the label value corresponding to the detouring GW device 20 that transfers the log when an abnormality in the transfer destination GW device 20 of the log has occurred for each GW device 20 of the transfer source that may select the GW device 20 in which an abnormality may occur as the transfer destination. Then, the rule generating unit 13D transmits the generated rule for the detouring label value management table to the corresponding GW device 20 of the transfer source.

More specifically, the rule generating unit 13D, referring to the detouring label path information table T7, specifies a detouring path P2 that has been allocated a label value different from the main signal label value as the detouring label value and, by referring to the main signal label path information table T6, specifies the main signal path P1 corresponding to the specified detouring path P2. Then, the rule generating unit 13D specifies the GW device 20 on the main signal path P1 right in front of the assumed abnormal GW device 20 corresponding to the specified detouring path P2. The rule generating unit 13D generates the rule for the detouring label value management table including information that associates the main signal label value, the identifier GWk of the assumed abnormal GW device 20, and the detouring label value and transmits the generated rule for the detouring label value management table to the specified GW device 20 located right in front of the assumed abnormal GW device 20.

For example, referring to FIG. 8 and FIG. 9, the detouring label value allocated to the detouring path P2 corresponding to the entry/exit pair of entry GW device GW3 and exit GW device GW1 when the assumed abnormal GW device 20 is the GW device GW2, is L7, which is different from the main signal label value L1. Therefore, the rule generating unit 13D, referring to the main signal label path information table T6, specifies the corresponding main signal path P1 (the path {GW3, GW2, GW1}), and specifies the GW device GW3 as the GW device 20 right in front of the assumed abnormal GW device GW2. Then, the rule generating unit 13D generates the rule for the detouring label value management table including information that associates the main signal label value L1, the identifier GW2 of the assumed abnormal GW device 20, and the detouring label value L7 and transmits the generated rule for the detouring label value management table to the GW device GW3 (located right in front of the assumed abnormal GW device 20).

Also, for example, the rule generating unit 13D generates for each accommodation destination GW device 20 of the GW controller 10 or the SA server 40, an application distribution rule indicating the data type of the data to distribute as the accommodation destination GW 20 and a distribution destination address when receiving the data of the data type, and transmits the generated application distribution rule to the respective corresponding accommodation destination GW device 20.

More specifically, the rule generating unit 13D, referring to the application accommodation destination GW management table T5, extracts for each accommodation destination GW device 20 the corresponding application ID, and, referring to the subscription management table T4, extracts for each accommodation destination GW device 20 the data type of the data that the accommodation destination GW device 20 should distribute by specifying the data type corresponding to the extracted application ID. Then, the rule generating unit 13D generates for each accommodation destination GW 20 an application distribution rule including information that associates the extracted data type and the distribution destination address when the accommodation destination GW 20 received the data of the data type.

Also, for example, the rule generating unit 13D generates a distinction rule indicating for each data type the label value to be added to the data subject in transmission and transmits the generated distinction rule to the entry GW device 20. More specifically, the rule generating unit 13D generates the distinction rule including information indicating a corresponding relationship between the data type and the main signal label value, which is linked by the data label MAP processing unit 13C.

The updating unit 13E updates the topology/link state management table T1 on the basis of the collected log.

Figure 11:
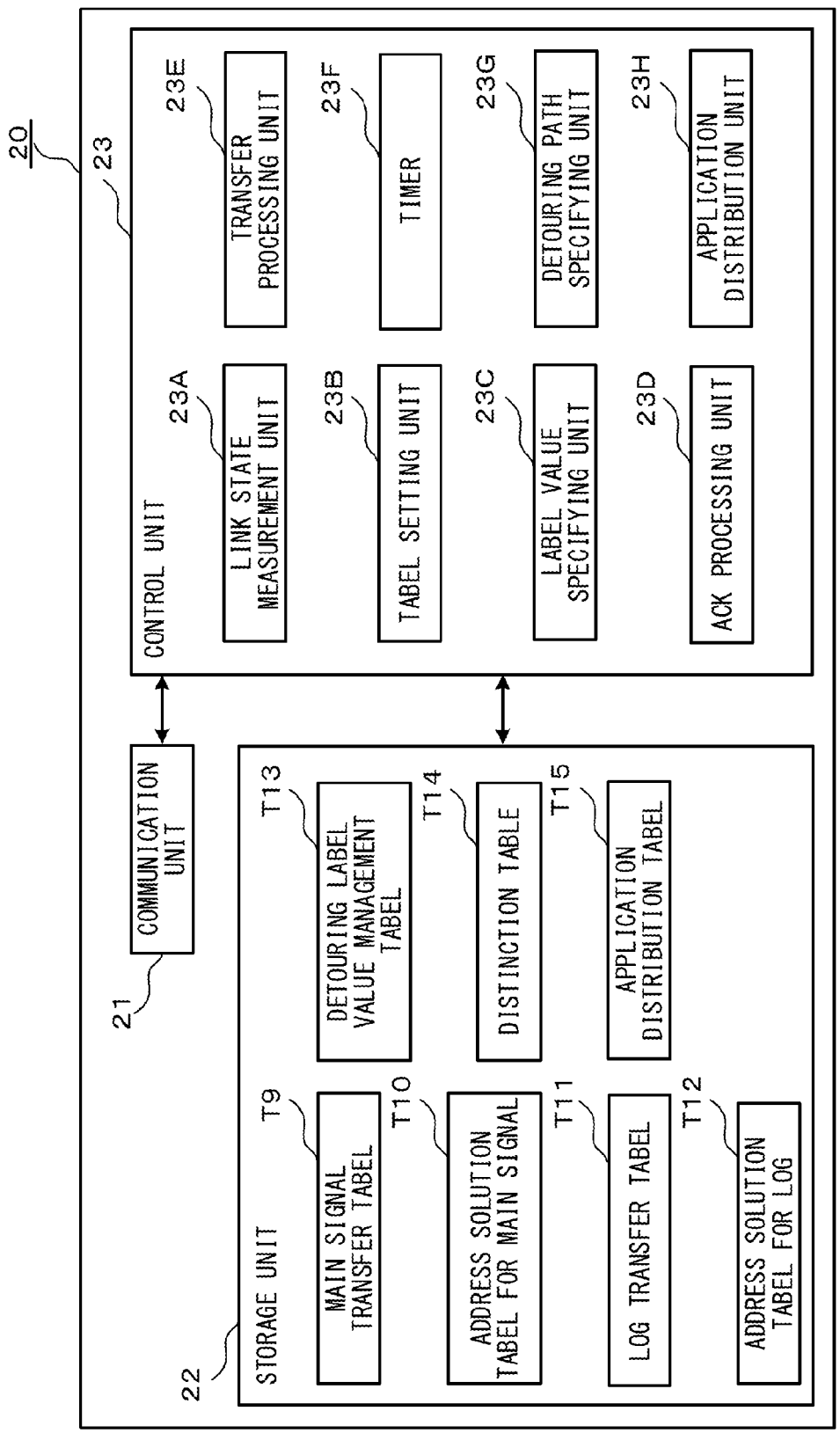
FIG. 11 is a functional block diagram illustrating a configuration example of a gateway device constituting the network system.

Next, referring to FIG. 11, the GW device 20 in this embodiment will be explained. FIG. 11 is a functional block diagram illustrating a configuration example of the GW device 20 constituting the network system 100 in this embodiment.

The GW device 20 is a data relay device for relaying data and, as illustrated in FIG. 11, is provided with a communication unit 21, a storage unit 22, and a control unit 23.

The communication unit 21 is, for example, provided with a communication module etc. and communicates with the other devices constituting the network system 100. For example, the communication unit 21 receives a variety of rules transmitted from the GW controller 10.

Also, for example, when the communication unit 21 receives data (a main signal) or a log, the communication unit 21 outputs the received data (the main signal) or the log to a label value specifying unit 23C (details will be described later).

The storage unit 22, for example, is provided with a RAM, a ROM, a flash memory, and the like. The storage unit 22 functions as a work area of the MPU included in a control unit 23, a program area for storing various programs such as an operation program for controlling the entire GW device 20, and as a data area for storing various data such as a main signal transfer table T9 which will be described below in more detail.

Referring now to FIGS. 12 through 18, tables such as the main signal transfer table T9 that is stored in the data area of the storage unit 22 will be explained.

Each of the FIGS. 12A through 12F is a diagram illustrating an example of a main signal transfer table T9 in the present embodiment. FIG. 12A is an example of the main signal transfer table T9 of the GW device GW1, FIG. 12B of the GW device GW2, FIG. 12C of the GW device GW3, FIG. 12D of the GW device GW4, FIG. 12E of the GW device GW5, and FIG. 12F of the GW device GW6. The example in FIG. 12 corresponds to the main signal label path information table T6 of the example of FIG. 8.

The main signal transfer table T9 is managed by a table setting unit 23B (details will be described below) and manages the transfer destination of the received data (the main signal) and, as illustrated in FIG. 12, is a table in which the identifier GWk of the transfer destination GW device 20 is associated with each label value.

For example, referring to FIG. 12B and FIG. 12C, when receiving data to which the label value L1 has been added, the GW devices GW3, referring to the main signal transfer table T9, transfer the received data to the GW device GW2, and the GW device GW2 transfers the received data to the GW device GW1.

Each of the FIGS. 13A through 13F is a diagram illustrating an example of an address solution table for the main signal T10 in the present embodiment. FIG. 13A is an example of an address solution table for the main signal T10 of the GW device GW1, FIG. 13B of the GW device GW2, FIG. 13C of the GW device GW3, FIG. 13D of the GW device GW4, FIG. 13E of the GW device GW5, and FIG. 13F of the GW device GW6. The example of FIG. 13 corresponds to the GW address management table T2 of the example of FIG. 4 and corresponds to the main signal label path information table T6 of the example of FIG. 8.

The address solution table for the main signal T10 is managed by the table setting unit 23B and manages the transfer destination address of the received data (the main signal), and, as illustrated in FIG. 13, is a table in which an address is associated with each identifier GWk of the transfer destination GW device 20.

The GW device 20, when receiving the data (main signal), referring to the main signal transfer table T9, specifies the identifier GWk of the transfer destination GW device 20 on the basis of the label value added to the received data (main signal), and, referring to the address solution table for the main signal T10, further specifies the address of the transfer destination on the basis of the specified identifier GWk. In this way, it is possible to deliver the data (main signal) to the final destination in response to the label value. In addition, when a label value is not added to the received data (main signal), as will be described later, the GW device 20, referring to the distinction table 14, adds a label value to the received data (main signal) and specifies the identifier GWk of the transfer destination GW device 20 on the basis of that added label value.

Each of FIG. 14A through 14F is a diagram illustrating an example of a log transfer table T11 in the present embodiment. FIG. 14A is an example of the log transfer table T11 of the GW device GW1, FIG. 14B of the GW device GW2, FIG. 14C of the GW device GW3, FIG. 14D of the GW device GW4, FIG. 14E of the GW device GW5, and FIG. 14F of the GW device GW6. The example of FIG. 14 corresponds to the detouring label path information table T7 of the example of FIG. 9.

The log transfer table T11 is managed by the table setting unit 23B and manages the transfer destination of the received or generated log, and, as illustrated in FIG. 14, is a table in which the identifier GWk of the transfer destination GW device 20 is associated with each label value.

For example, referring to FIGS. 14C, 14D and 14F, when receiving a log to which the label value L7 is added, the GW devices GW3, referring to the log transfer table T11, transfer the received log to the GW device GW4, the GW device GW4 transfers the received log to the GW device GW6, and the GW device GW6 transfers the log to the GW device GW1.

Each of FIGS. 15A through 15F is a diagram illustrating an example of the address solution table for the log T12 in the present embodiment. FIG. 15A is an example of the address solution table for the log T12 of the GW device GW1, FIG. 15B of the GW device GW2, FIG. 15C of the GW device GW3, FIG. 15D of the GW device GW4, FIG. 15E of the GW device GW5, and FIG. 15F of the GW device GW6. The example of FIG. 15 corresponds to the GW address management table T2 of the example of FIG. 4 and the detouring label path information table T7 of the example of FIG. 9.

The address solution table for the log T12 is managed by the table setting unit 23B and is a table that manages the address of the transfer destination of the received or generated log, and, as illustrated in FIG. 15, is a table in which the address is associated with each identifier GWk of the transfer destination GW device 20.

The GW device 20, when receiving (or generating) the log, referring to the log transfer table T11, specifies the identifier GWk of the transfer destination GW device 20 on the basis of the label value added to the log and, referring to the address solution table for the log T12, further specifies the address of the transfer destination on the basis of the specified identifier GWk. In this way, it is possible to deliver the log to the final destination in response to the label value. Note that when a log is generated, as will be described later, the GW device 20, referring to the distinction table 14, adds a label value to the generated log and specifies the identifier GWk of the transfer destination GW device 20 on the basis of that added label value.

Each of the FIGS. 16A through 16C is a diagram illustrating an example of a detouring label value management table T13 in the present embodiment. FIG. 16A is an example of a detouring label value management table 113 of the GW device GW3, FIG. 16B of the GW device GW4, and FIG. 16C of the GW device GW5. The example in FIGS. 16A-16C corresponds to the main signal label path information table T6 of the example of FIG. 8 and the detouring label path information table T7 of the example of FIG. 9.

The detouring label value management table T13 is managed by the table setting unit 23B and manages the detouring label value added to the log when an abnormality occurs in the transfer destination GW device 20 of the log, and, as illustrated in FIGS. 16A-16C, is a table in which the label value at normal state (hereinafter, normal label value), the identifier GWk of the abnormal GW device 20, and the detouring label value are associated with each other. Therefore, in the present embodiment, the detouring label value management table T13 is only provided with the transfer source GW 20 in which an abnormality may occur in the transfer destination GW device 20 of the log.

The normal label value is a label value that is added to a log when no abnormality occurs, that is, during normal state. In the present embodiment, the normal label value is the main signal label value corresponding to the accommodation destination GW device 20 of the GW controller 10.

Each of the FIGS. 17A through 17F is a diagram illustrating an example of a distinction table T14 in the present embodiment. FIG. 17A is an example of the distinction table T14 of the GW device GW1, FIG. 17B of the GW device GW2, FIG. 17C of the GW device GW3, FIG. 17D of the GW device GW4, FIG. 17E of the GW device GW5, and FIG. 17F of the GW device GW6. The example of FIG. 17 corresponds to the subscription management table T4 of the example of FIG. 6, the application accommodation destination management table T5 of the example of FIG. 7, and the main signal label path information table T6 of the example of FIG. 8.

The distinction table T14 is managed by the table setting unit 23B and manages the label value to be added to the data when the data does not has a label value added to it, and, as illustrated in FIG. 17, is a table in which the label value is associated with each data type. The GW device 20, when no label value has been added to the data, referring to the distinction table T14, specifies the label value on the basis of the data type of the data that is subject to processing, and adds the specified label value to the data.

FIG. 18 is a diagram illustrating an example of the application distribution table T15 in the present embodiment. The example of FIG. 18 is an example of the application distribution table T15 of the GW device GW1. The example of FIG. 18 corresponds to the subscription management table T4 of the example of FIG. 6.

The application distribution table T15 is managed by the table setting unit 23B and manages the addresses of the transfer destination in order to distribute the data received as the accommodation destination GW device 20 to the SA server 40 (or the GW controller 10). The application distribution table T15, as illustrated in FIG. 18, is a table in which the address of the transfer destination is associated with each data type.

For example, the GW device GW1, when receiving the log, referring to the application distribution table T15 exemplarily illustrated in FIG. 18, specifies the address of the transfer destination of the log (the address of the GW controller 10). In this way, it is possible for the GW device GW1 which is the accommodation destination GW device 20 of the GW controller 10 to transmit the received log to the GW controller 10.

Returning to FIG. 11, a control unit 23, for example, is provided with the MPU and the like and executes the operation program stored in the program area of the storage unit 22, and, as illustrated in FIG. 11, carries out the functions of a link state measurement unit 23A, the table setting unit 23B, a label value specifying unit 23C, an ACK processing unit 23D, a transfer processing unit 23E, a timer 23F, a detouring path specifying unit 23G, and an application distribution unit 23H.

The control unit 23 further executes the operation program, and executes control processing for controlling the entire GW device 20 and log transfer processing, etc., which will be described in detail later.

The link state measurement unit 23A, for example, periodically measures the link state (link delay, fluctuations, etc.) between the adjacent GW devices 20 where a link exists, generates a log that includes the measurement results, and outputs the generated log to the label value specifying unit 23C.

The table setting unit 23B, when receiving the various rules that are transmitted from the GW controller 10, sets various tables, such as the main signal transfer table T9, on the basis of the received rules.

For example, when receiving the rule for the main signal transfer table, the table setting unit 23B sets the main signal transfer table T9, as exemplarily illustrated in FIG. 12. Also, for example, when receiving the rule for the log transfer table, the table setting unit 23B sets the log transfer table T11, as exemplarily illustrated in FIG. 14. In this case, when "NULL" is associated with the label value, the table setting unit 23B sets the main signal transfer table T9 (or log transfer table T11) associating "Local" as the identifier GWk with that label value.

Also, for example, when receiving the rule for the address solution rule table for the main signal, the table setting unit 23B sets the address solution table for the main signal T10, as exemplarily illustrated in FIG. 13. Also, for example, when receiving the rule for the address solution table for the log, the table setting unit 23B sets the address solution table for the log T12, as exemplarily illustrated in FIG. 15. Also, for example, when receiving the rule for the detouring label value management table, the table setting unit 23B sets the detouring label value management table T13, as exemplarily illustrated in FIGS. 16A-16C. Also, for example, when receiving the distinction rule, the table setting unit 23B sets the distinction table T14, as exemplarily illustrated in FIG. 17. Also, for example, when receiving the application distribution rule, the table setting unit 23B sets the application distribution table 115, as exemplarily illustrated in FIG. 18.

The label value specifying unit 23C specifies a label value to be added when a label value is not added to the data (main signal) that is subject to processing or a log. More particularly, when a data (main signal) or log received by the communication unit 21 or a log generated by the link state measurement unit 23A is input, the label value specifying unit 23C determines whether or not a label value has been added to the input data (or log). When no label value has been added, the label value specifying unit 23C specifies a label value on the basis of a data type with reference to the distinction table T14 and adds the specified label value to the data (or log) that is subject to processing.

The ACK processing unit 23D transmits an ACK (ACKnowlegment) indicative of receipt to the transfer source GW device 20 in the case where a label value has been added to the received data (main signal) or log.

The transfer processing unit 23E executes the transfer processing of the data (main signal) or log that is subject to processing. More specifically, when taking the log as an example, the transfer processing unit 23E specifies a transfer destination on the basis of the added label value with reference to the log transfer table T11. In the case where a transfer is then directed to some other GW device, the transfer processing unit 23E stores a log subject to processing in a data area of the storage unit 22 and specifies, on the basis of identifier GWk of the specified transfer destination, a transfer destination address to which to transmit the log subject to processing.

The transfer processing unit 23E causes the timer 23F to start and deletes the log stored in the data area in the case where there is an ACK reply from the transfer destination GW device 20 in a specified period of time. On the other hand, in the case where the timer 23F causes a time-out before the ACK is received, the transfer processing unit 23E determines whether the label value added to the log subject to processing is consistent with a normal label value with reference to the detouring label value management table T13.

In the case where the label value is not consistent with the normal label value, the transfer processing unit 23E deletes the log stored in the data area. In the case, however, where the label value is consistent with the normal label value, the transfer processing unit 23E gives the log an identifier GWk of the transfer destination GW device 20 of which the ACK does not reach.

The timer 23F is a timer which manages whether the ACK transmitted from the transfer destination GW device 20 can be received in a specified period of time, that is, a timer which determines whether an abnormality occurs in the transfer destination GW device 20 and which is controlled by the transfer processing unit 23E.

When an identifier GWk of a transfer destination GW device 20 to which the ACK is not given as a reply is given by the transfer processing unit 23E, the detouring path specifying unit 23G specifies a detouring label value on the basis of an identifier GWk and the label value added to the log with reference to the detouring label value management table T13 and updates the label value added to the log in accordance with the specified detouring label value. That is, the detouring path specifying unit 23G deletes the label value added to the log and adds the specified detouring label value to the log. The transfer processing unit 23E then executes the transfer processing again, so that the log is delivered to the GW controller 10 through a detouring path P2.

The application distribution unit 23H specifies an address (URL) in accordance with a data type with reference to the application distribution table T15 in the case where transfer destination of data (a main signal) or a log that is subject to processing specified by the transfer processing unit 23E is local, deletes a label value added to the data (main signal) or the log that is subject to processing and then transmits the data (main signal) or the log that is subject to processing to the address (URL). Thus, the application distribution unit 23H allots and transmits subject data that the GW controller 10 or the SA server 40 collects.

Next, a flow of the processing with respect to the generation of a main signal label path in the present embodiment will be described with reference to FIG. 19. FIG. 19 is an example of a flow chart to describe a flow of the generation processing of the main signal label path in the present embodiment. The generation processing of the main signal label path is executed by the GW controller 10 and starts in accordance with the arrival of a predetermined timing as a trigger.

The path calculation unit 13A determines whether or not the predetermined timing has arrived (step S001). When it is determined by the path calculation unit 13A that the predetermined timing has not arrived yet (step S001: NO), the processing is repeated and waits for the arrival of the predetermined timing.

On the other hand, when determining that the predetermined timing has arrived (step S001: YES), the path calculation unit 13A obtains the topology/link information with reference to the topology/link state management table T1 (step S002). In this case, the path calculation unit 13A obtains other parameters with respect to a link state, such as fluctuations or bandwidths when necessary.

The path calculation unit 13A then specifies all entry/exit pairs with reference to the entry/exit management table T3, calculates a main signal path P1 for all of the specified entry/exit pairs, at least in accordance with the topology and link information, and stores the main signal path P1 relating to each specified entry/exit pair in the main signal label path information table T6 (step S003).

The label value allocation unit 13B then select one of the unselected entry/exit pairs with reference to the main signal label path information table T6 (step S004) and determines whether or not there are other entry/exit pairs that have the same exit GW device 20 as the selected entry/exit pair (step S005).

When determining that there are other entry/exit pairs that have the same exit GW device 20 as the selected entry/exit pair (step S005: YES), the label value allocation unit 13B further determines with reference to the main signal label path information table T6 whether or not there are any entry/exit pairs to which a label value has already been allocated for the corresponding main signal path P1 among the other entry/exit pairs that have the same exit GW device 20 as the selected entry/exit pair (step S006).

When determining that there is an entry/an exit pair to which a label value has already been allocated (step S006: YES), the label value allocation unit 13B allocates, as a main signal label value, the same label value as the entry/exit pair (step S007). The processing advances to step S010 to be described later.

On the other hand, when determining that there are no other entry/exit pairs that have the same exit GW device 20 as the selected entry/exit pair (step S005: NO) or that there are no other entry/exit pairs to which a label value is allocated (step S006: NO), the label value allocation unit 13B selects one of the unallocated label values with reference to the empty label value management table T8 and sets "1" to an in-use flag corresponding to the selected label value (step S008).

The label value allocation unit 13B then allocates the selected label value to the main signal path P1 of the selected entry/exit pair as a main signal label value (step S009) and stores the allocated main signal label value relating to the main signal path P1 of the selected entry/exit pair in the main signal label path information table T6 (step S010).

The label value allocation unit 13B then determines whether or not the main signal label value has been allocated to all entry/exit pairs (step S011), and when there are still entry/exit pairs to which the main signal label value has not been allocated (step S011: NO), the processing returns to step S004 and the processing described above is repeated.

On the other hand, when the main signal label value is allocated to all of the entry/exit pairs (step S011), the rule generating unit 13D generates the rule for the main signal transfer table and the rule for the main signal address solution table and transmits the generated rules to the GW device 20 subject to distribution (step S012). The processing is then terminated.

Next, a flow of the generation processing of a detouring label path will be described with reference to FIGS. 20 through 22. FIGS. 20 through 22 are examples of flow charts, i.e., the first, second and third portion of the example of flow chart to describe the generation processing of the detouring label path in the present embodiment. The generation processing of the detouring label path is executed by the GW controller 10 and starts in accordance with the arrival of a predetermined timing as a trigger.

The path calculation unit 13A determines whether or not the predetermined timing has arrived (step S101). When it is determined that the predetermined timing has not arrived yet (step S101:NO), the processing repeats step S101 and waits for the arrival of the predetermined timing.

On the other hand, when determining that the predetermined timing has arrived (step S101:YES), the path calculation unit 13A obtains the topology/link information with reference to the topology/link state management table T1 (step S102). The path calculation unit 13A then specifies the accommodation destination GW device 20 of the GW controller 10 of the path calculation unit 13A with reference to the application accommodation destination GW management table T5 (step S103) and selects one of the unselected GW devices 20 as an assumed abnormal GW device 20 from among the GW devices 20 aside from the specified accommodation destination GW device 20 (step S104).

The path calculation unit 13A refers to the entry/exit management table T3 to specify all entry/exit pairs that make the specified accommodation destination GW device 20 the entry/exit GW device 20 in the case where the selected assumed abnormal GW device 20 does not exist in the topology, and specifies a detouring path p2 for each specified entry/exit pair (step S105). In other words, the path calculation unit 13A stores the specified detouring path P2 relating to each entry/exit pair in the detouring label path information table T7.

The path calculation unit 13A determines whether or not all GW devices 20 except for the accommodation destination GW device 20 specified in the processing of step S103 are selected as the assumed abnormal GW device 20 (step S106). When it is determined that there are GW devices not selected as the assumed abnormal GW device (step S106: NO), the processing returns to step S104 and the processing described above is repeated.

On the other hand, when it is determined that all of the GW devices 20 except for the accommodation destination GW device 20 are selected as the assumed abnormal GW device 20 (step S106: YES), the label value allocation unit 13B refers to the detouring label path information table T7 to select one of the assumed abnormal GW devices 20 (step S107) and selects one of the entry GW devices 20 corresponding to the selected assumed abnormal GW device 20 (step S108). That is, the label value allocation unit 13B selects one of the entry GW devices 20 aside from the specified accommodation destination GW device 20 and the selected assumed abnormal GW device 20.

The label value allocation unit 13B refers to the detouring label path information table T7 to specify the corresponding detouring path P2 (step 109) and obtains the corresponding main signal label value (step S110). The label value allocation unit 13B then refers to the main signal label path information table T6 and the detouring label path information table T7 to determine whether or not the specified detouring path P2 is the same as the corresponding main path P1 (step S111).

When determining that the specified detouring path P2 and its corresponding main signal path P1 are the same path (step S111:YES), the label value allocation unit 13B allocates the same label value as the obtained main signal label value to the specified detouring path P2 as a detouring label value (step S112). The processing advances to step S117 to be described later.

On the other hand, when determining that the specified detouring path P2 and the corresponding main signal path P1 are not the same path (step S111: NO), the label value allocation unit 13B further refers to the detouring label path information table T7 to determine whether or not there is an entry GW device 20 to which a label value different from the main label value is allocated as a detouring label value among the entry GW devices 20 aside from the selected entry GW device 20 corresponding to the selected assumed abnormal GW device (step S113).

When determining that there is an entry GW device 20 to which a label value different from the main label value is allocated as a detouring label value (step S113: YES), the label value allocation unit 13B allocates to the specified detouring path P2 a label value different from the main signal label value as a detouring label value (step S114). The processing advances to step S117 to be described later.

On the other hand, when determining that there is no entry GW device 20 to which a label value different from the main label value is allocated as a detouring label value (step S113: NO), the label value allocation unit 13B then refers to the empty label value management table T8 to select one of the unallocated label values and sets an in-use flag corresponding to the selected label value to "1" (step S115). The label value allocation unit 13B allocates the selected label value to the specified detouring path P2 as a detouring label value (step S116).

Further, the label value allocation unit 13B stores the allocated detouring label value in the detouring label path information table T7 in association with the specified detouring path P2 (step S117), and determines whether or not all of the entry GW devices 20 except for the specified accommodation destination GW device 20 and the assumed abnormal GW device 20 are selected (step S118). When it is determined that there is still an unselecting entry GW device 20 (step S118: NO), the processing returns to step S108 and the processing described above is repeated.

On the other hand, when determining that all entry GW devices 20 are selected (step S118: YES), the label value allocation unit 13B further determines whether or not all GW devices 20 except for the specified accommodation destination GW device 20 are selected as the assumed abnormal GW device 20 (step S119). When it is determined that there is still a GW device 20 that is not selected as the assumed abnormal GW device 20 (step S119: NO), the processing returns to step S107 and the processing described above is repeated.

When it is determined that all of the entry GW devices 20 are selected as the assumed abnormal GW device 20 (step S119: YES), then the rule generating unit 13D generates the rule for the log transfer table, the rule for the address solution table for the log, and the rule for the detouring label value management table and transmits the generated rules to the GW devices 20 subject to distribution (step S120). The processing is then terminated.

Next, a flow of the transmission processing of the distinction rule, etc. in the present embodiment will be described with reference to FIG. 23. FIG. 23 is an example of a flow chart to describe a flow of the transmission processing of for example the distinction rule in the embodiment. The transmission processing of the distinction rule, etc. is executed by the GW controller 10 and starts as a trigger in the case where the subscription management table T4 or the application accommodation destination GW management table T5 is updated or the like.

The data label MAP processing unit 13C refers to the subscription management table T4 to obtain subscription condition information (step S201) and also refers to the subscription management table T4 to obtain accommodation destination GW information (step S202).

The data label MAP processing unit 13C then specifies an accommodation destination GW device 20 corresponding to each data type in accordance with the obtained subscription condition information and accommodation destination information (step S203) and also refers to the main signal label path information table T6 to specify a main signal label value corresponding to each specified accommodation destination GW device 20 (step S204).

The rule generating unit 13D then generates an application distribution rule for each accommodation destination GW device 20 and transmits the generated application distribution rule to each accommodation destination GW device 20 subject to distribution (step S205). Further, the rule generating unit 13D generates a distinction rule and transmits the generated distinction rule to an entry GW device 20 subject to distribution (step S206). The processing is then terminated.

Next, a flow of the log transfer processing in the present embodiment will be described with reference to FIGS. 24 and 25. FIGS. 24 and 25 are examples of a portion of a flow chart and another portion thereof to describe a flow of the log transfer processing in the embodiment, respectively. The log transfer processing is executed by each GW device 20 and starts in accordance with a log input to the label value specifying unit 23C as a trigger.

The label value specifying unit 23C determines whether or not a log is input (step S301). When it is determined that no log has been input yet (step S301: NO), the processing repeats step S301 and waits for a log input.

On the other hand, when determining that a log has been input (step S301: YES), the label value specifying unit 23C further determines whether or not a label value has been added to the log subject to processing (step S302). When the label value specifying unit 23C determines that the label value has been added to the log subject to processing (step S302: YES), the ACK processing unit 23D transmits the ACK to the transfer source GW device 20 (step S303). The processing advances to step S306 to be described later.

When, however, determining that no label value has been added to the log subject to processing (step S302: NO), the label value specifying unit 23C refers to the distinction table T14 to specify a label value corresponding to the log (step S304) and gives the specified label value to the log subject to processing (step S305).

The transfer processing unit 23E then refers to the log transfer table T11, specifies a transfer destination in accordance with the added label value (step S306), and determines whether or not the specified transfer destination is local (step S307).

When the transfer processing unit 23E determines that the specified transfer destination is local (step S307: YES), the application distribution unit 23H refers to the application distribution table T15 to specify a transmission address (URL) of the log (step S308). Further, the application distribution unit 23H then deletes the label value added to the log subject to processing (step S309) and transmits the log subject to processing to the specified address (URL) (step S310).

When, however, determining that the specified transfer destination is not local (step S307: NO), the transfer processing unit 23E temporally stores the log subject to processing in a data area of the storage unit 22 (step S311), refers to the address solution table for the log T12 to specify an address of the transfer destination in accordance with identifier GWk of the specified transfer destination and transmits the log subject to processing (step S312).

The transfer processing unit 23E then causes the timer 23F to start (step S313) and determines whether or not the ACK transmitted from the transfer destination GW device 20 has been received (step S314). When determining that the ACK has been received (step S314: YES), the transfer processing unit 23E determines that the log transfer could be made normally, and deletes the log stored in the data area (step S315). The processing is then terminated.

On the other hand, when determining that the ACK has not been received yet (step S314: NO), the transfer processing unit 23E further determines whether or not the timer 23F has timed out (step S316). When it is determined that the timer 23F has not timed out yet (step S316: NO), the processing returns to step S314 and the processing described above is repeated.

On the other hand, when determining that the timer 23F has timed out (step S316: YES), the transfer processing unit 23E further refers to the detouring label value management table T13 to determine whether or not the label value added to the log subject to processing is consistent with the normal label value (step S317).

When determining that the label value added to the log subject to processing is not consistent with the normal label value (step S317: NO), the transfer processing unit 23E deletes the log stored in the data area (step S318). On the other hand, when determining that the label value is consistent with the normal label value (step S317: YES), the transfer processing unit 23E gives the log the identifier GWk of the transfer destination GW device 20 of which the ACK does not reach (step S319).

The detouring path specifying unit 23G specifies a detouring label value in accordance with the identifier GWk and the label value added to the log subject to processing with reference to the detouring label value management table T13 (step S320), and updates the label value added to the log in accordance with the specified detouring label value (step S321). The processing returns to step S306 and the processing described above is repeated.

Next, with reference to FIG. 26 a log transfer processing at a normal state in the present embodiment will be described in accordance with a concrete example. FIG. 26 is a concrete example to describe a flow of the normal log transfer processing at a normal state in the network system 100 of the embodiment. Note that the concrete example is assumed to describe a flow up to a point at which a log generated by the link state measurement unit 23A of the GW device GW4 is transmitted to the GW controller 10. Further, it is assumed that the log transfer table T11 of each GW device 20 is the one illustrated in FIG. 14 and that the distinction table T14 of the GW device GW4 and the application distribution table T15 of the GW device GW1 are the ones illustrated in FIG. 17D and FIG. 18, respectively.

The GW device GW 4 specifies L1 as a label value with reference to the distinction table T14 and adds the specified label value L1 to the generated log. The GW device GW4 specifies the GW device GW3 as a transfer destination corresponding to the label value L1 with reference to the log transfer table T11 and transfers the log to which the label value L1 has been given to the specified GW device GW3.

When the log to which the label value L1 has been given is received, the GW device GW3 transmits the ACK to the transfer source GW device GW4. In the concrete example, it is assumed that the ACK is received in the GW device GW4 before the time-out.

The GW device GW3 then refers to the log transfer table T11, specifies the GW device GW2 as a transfer destination corresponding to the label value L1, and transfers the log to which the label value L1 has been given to the specified GW device GW2. When the log to which the label value L1 has been given is received, the GW device GW2 transmits the ACK to the transfer source GW device GW3. In the concrete example, it is assumed that the ACK is received in the GW device GW3 before the time-out.

Further, the GW device GW2 refers to the log transfer table T11, specifies the GW device GW1 as a transfer destination corresponding to the label value L1, and transfers to the GW device GW1 the log to which the label value L1 has been given.

When the log to which the label value L1 has been given is received, the GW device GW1 transmits the ACK to the transfer source GW device GW2. In the concrete example, it is assumed that the ACK is received in the GW device GW2 before the time-out.

The GW device GW1 then refers to the log transfer table T11 and specifies local as a transfer destination corresponding to the label value L1. The GW device GW1 further refers to the application distribution table T15 and specifies a transmission address of the log (address of the GW controller 10). The GW device GW1 deletes the label value L1 given to the log and transmits the log to the GW controller 10.

Next, with reference to FIG. 27 the log transfer processing at an abnormal occurrence state in the present embodiment will be described in accordance with a concrete example. FIG. 27 is a concrete example describing a flow of the log transfer processing at an abnormal occurrence state in the network system 100 of the embodiment.

Note that the concrete example is assumed to describe a flow up to a point at which a log generated by the link state measurement unit 23A of the GW device GW4 is transmitted to the GW controller 10. Further, it is assumed that the log transfer table T11 of each GW device 20 is the one illustrated in FIG. 14 and that the distinction table T14 of the GW device GW4 and the application distribution table T15 of the GW device GW1 are the ones illustrated in FIG. 17D and FIG. 18, respectively. Further, the detouring label value management table T13 of the GW device GW3 is assumed to be exemplified in FIG. 16A.

The GW device GW4 specifies L1 as a label value with reference to the distinction table T14 and gives the specified label value L1 to the generated log. The GW device GW4 specifies the GW device GW3 as a transfer destination corresponding to the label value L1 with reference to the log transfer table T11 and transfers the log to which the label value L1 has been given to the specified GW device GW3.

When the log to which the label value L1 has been given is received, the GW device GW3 transmits the ACK to the transfer source GW device GW4. In the concrete example, it is assumed that the ACK is received in the GW device GW4 before the time-out.

The GW device GW3 then refers to the log transfer table T11, specifies the GW device GW2 as a transfer destination corresponding to the label value L1, and transfers the log to which the label value L1 has been given to the specified GW device GW2. It is assumed in the concrete example that a failure has occurred in the GW device GW2.

Since the GW device GW3 cannot receive the ACK from the transfer destination GW device GW2 within a specified period of time, the GW device GW3 gives the log identifier GW2 of the transfer destination, specifies L7 as a detouring label value with reference to the detouring label value management table T13, and updates the label value given to the log with the specified label value L7. The GW device GW3 specifies the GW device GW4 as a transfer destination corresponding to the label value L7 with reference to the log transfer table T11 and transfers the log to which the label value L7 has been given to the specified GW device GW4.

When the log to which the label value L7 has been given is received, the GW device GW4 transmits the ACK to the transfer source GW device GW3. In the concrete example, it is assumed that the ACK is received in the GW device GW3 before the time-out.

The GW device GW4 then refers to the log transfer table T11, specifies the GW device GW6 as a transfer destination corresponding to the label value L7, and transfers the log to which the label value L7 has been given to the specified GW device GW6.

When the log to which the label value L7 has been given is received, the GW device GW6 transmits the ACK to the transfer source GW device GW4. In the concrete example, it is assumed that the ACK is received in the GW device GW4 before the time-out.

Further, the GW device GW6 refers to the log transfer table T11, specifies the GW device GW1 as a transfer destination corresponding to the label value L7, and transfers to the GW device GW1 the log to which the label value L7 has been given.

When the log to which the label value L7 has been given is received, the GW device GW1 transmits the ACK to the GW device GW6. In the concrete example, it is assumed that the ACK is received in the GW device GW6 before the time-out.

The GW device GW1 then refers to the log transfer table T11, specifies local as a transfer destination corresponding to the label value L7. The GW device GW1 further refers to the application distribution table T15, and specifies a transmission address (address of a GW controller 10). The GW device GW1 then deletes the label value L7 given to the log and transmits the log to the GW controller 10.

As described above, in the present embodiment it is possible to send a log to the GW controller 10 by making use of a detouring path P2 set in advance even if there is an abnormal state such as the occurrence of a failure in a GW device 20 on a transfer path of the log and it is also possible to maintain the optimal path for a network system 100.

According to the embodiments described above, one label value is allocated to a log path in which an accommodation destination GW device 20 of the GW controller 10 is set to be an exit so as to define a label path. With this, it is possible to integrate the number of connections at a log collection time and it is also possible to reduce a load of the GW controller 10.

Further, since a label value allocated to a log path is one, a table size and a management information quantity of each GW device 20 can be reduced, and it is possible to make effective use of memory resources.

Further, according to the embodiments described above, the detouring path P2 is set in advance and if an abnormality occurs with the GW device 20 on the main signal path P1, a log is delivered to the GW controller 10 by making use of the detouring path P2. In this way, even if an abnormality occurs in the GW device 20 on the main signal path P1, it is possible for the GW controller 10 to collect the log, thereby enabling maintaining of an optimal path of the network system 100.

In addition, according to the embodiments described above, if an abnormality occurs in a log transfer destination GW device 20, an identifier GWk of the transfer destination GW device 20 is given the log, and the log in this state is delivered to the GW controller 10. In this way, it is possible for the GW controller 10 to detect immediately an abnormality of the GW device 20 on the log path without analyzing the contents of the log.

Note that, although it is assumed that a log path at the normal state is the main signal path P1, the log path at the normal state is not limited to this, and if the main signal path P1 is specified in consideration of parameters other than a link delay, a minimum link delay path is set as a log path at the normal state so that a different label value can be given. Even in this way, the increase in a label value to be used is only by one.

Also, although the detouring label path information table T7 is constituted on the assumption that GW device 20 where the abnormality concurrently occurs is one unit in the above described embodiments, the detouring label path information table T7 is not limited to this, so that the detouring label path information table T7 can be constituted on the assumption that an abnormality concurrently occurs with multiple units of GW devices 20. If an abnormality is assumed to concurrently occur with two units of the GW devices 20, for example, the detouring label path information table T7 can be made in such an example as illustrated in FIG. 28. FIG. 28 is another example of the detouring label path information table T7 in the embodiment.

Further, although, in the log transfer processing of the above described embodiments, a label value is determined to be inconsistent with the normal label value (step S317:NO), so that the transfer processing unit 23E deletes the log stored in the data area (step S318), the log transfer processing is not limited to this and, in this case, the log may be directly transmitted to the GW controller 10.

In this case, such processing as exemplified in FIG. 29 may be executed. That is, when determining that a label value is inconsistent with a normal label value with reference to FIG. 29 (step S317: NO), the transfer processing unit 23E additionally gives an identifier GWk of a transfer determination GW device 20 to the log (step S317A) and directly transmits the log to the GW controller 10 (step S317B). The transfer processing unit 23E then deletes the log stored in the data area (step S318). Here, FIG. 29 is a portion of another example of a flow chart to describe the log transfer processing in the embodiments.

FIG. 30 is a diagram illustrating an example of a hardware configuration of the GW controller 10 and the GW device 20 in the embodiments. The GW controller 10 illustrated in FIG. 2 and the GW device 20 illustrated in FIG. 11 can be realized with various kinds of hardware illustrated in FIG. 30, for example. In the example illustrated in FIG. 30, the GW controller 10 (or GW device 20) is provided with an MPU 201, a PHY (PHYsical layer) chip, and a timer IC (Integrated Circuit) 203. Further, the GW controller 10 (or GW device 20) is provided with a DRAM (Dynamic Random Access Memory) 204, a flash memory 205, a wireless communication module 206, and a reading-out device 207.

A communication interface connected between the MPU 201 and the PHY chip 202 is an MII/MDIO (Media Independent Interface or Management Data Input/Output) 209. Both the MII and the MDIO are an interface between a physical layer and a MAC (Media Access Control) sublayer. Further, the MPU 201 and the timer IC 203 are connected through an I²C/PIO (Inter-Integrated Circuit or Parallel Input/Output) bus 210. Further, the DRAM 204, the flash memory 205, the wireless communication module 206, and the reading-out device 207 are connected to the MPU 201 through a PCI (Peripheral Component Interconnect) bus 211.

The MPU 201 loads an operation program stored in a kind of non-volatile memory device such as a flash memory 205 and executes various kinds of processing while using the DRAM 204 as a working memory. The MPU 201 can achieve each function of the control unit 13 in FIG. 2 (or the control unit 23 illustrated in FIG. 11) by execution of the operation program.

Note that the operation program for executing the processing described above is stored in a computer readable medium 208 such as a CD-ROM (Compact Disc-Read Only Memory), a DVD (Digital Versatile Disc), an MO (Magnetic Optical disc), or the like and is distributed, and the same is read out by the GW controller 10 (or GW device 20) and is installed in a computer, so that the processing described above can be executed. Further, the operation program is stored in a disc device, etc. with which a server device is provided on the Internet and can be downloaded to a computer of the GW controller 10 (or GW device 20) through the PHY chip 202 or the wireless communication module 206.

Note that kinds of memory device other than the DRAM 204 and the flash memory 205 can be utilized. The GW controller 10 (or GW device 20) can include a CAM (Content Addressable Memory), an SRAM (Static Random Access Memory), An SDRAM (Synchronous Dynamic Random Access Memory), etc.

Tables such as the topology/link state management table T1 illustrated in FIG. 3 are materialized by the DRAM 204, the flash memory 205 or other non-illustrated memory devices.

The PHY chip 202 is a circuit that performs the processing of a physical layer in the wiring connection. The timer IC 203 is a circuit that carries out a count-up operation until a lapse of a set time and that outputs an interrupt signal after the lapse of the set time.

The wireless communication module 206 is a circuit that performs the processing of a physical layer in the wireless connection. The wireless communication module 206 includes an antenna, an ADC (Analog-to-Digital Converter), a DCA (Digital-to-Analog Converter), a modulator, a demodulator, an encoder, a decoder, etc.

Note that the hardware configuration of the GW controller 10 (or GW device 20) can be different in accordance with the embodiments, and hardware other than the protocol/type exemplified in FIG. 30 can be applied to the GW controller 10 (or GW device 20).

Each function unit of the control unit 13 illustrated in FIG. 2 (or the control unit 23 illustrated in FIG. 11), for example, can be materialized by a hardware circuit. In place of the MPU, in particular, a configurable circuit such as an FPGA (Field Programmable Gate Way) or an ASIC (Application Specific Integrated Circuit) can be used to realize each function unit of the control unit 13 illustrated in FIG. 2 (or the control unit 23 illustrated in FIG. 11). These function units can be realized by both the MPU 201 and a hardware circuit, as a matter of course.

Several embodiments have been described. However, the embodiments are not limited to these embodiments, and it should be understood that various modifications or replacements thereof are deemed to cover the present invention. It is easily understood that each embodiment can be made concrete by the modification of its constitutional elements without departing from the concept and scope thereof. Further, It can be understood that a plurality of constitutional elements described in the above-disclosed embodiments are appropriately combined to constitute various embodiments. Still further, those skilled in the art can understand that some constitutional elements of all constitutional elements described in the embodiments can be deleted or replaced or some constitutional elements can be added to the constitutional elements described in the embodiments to implement various embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments) of the present invention have been described in detail, it should be understood that the various changes, substitutions, and alterations could be made hereto without departing from the spirit and scope of the invention.

What is claimed is:

1. A data transfer control device for controlling a data transfer path for relay devices configuring a network system, the data transfer control device comprising:
    a storage which stores management information for managing a topology of the relay devices and a delay of a link for each of adjacent relay devices, the link existing between each of the relay devices and each of the adjacent relay devices, each of the adjacent relay devices being adjacent to each of the relay devices; and
    a processor which executes a process including:
        specifying, for each of the relay devices and in accordance with the topology and the delay of the link, a plurality of first transfer paths for state information indicative of a link state including the delay of the link, each of the plurality of first transfer paths being a path whose entry is each of other of the relay devices and whose exit is an accommodation destination device that is each of the adjacent relay devices;
        specifying, for each of the relay devices and in accordance with the topology and the delay of the link, a plurality of second transfer paths for the state information, each of the plurality of second transfer paths being an available path even when one of the relay devices becomes abnormal and also being a path whose entry is each of the relay devices excluding the abnormal relay device and whose exit is the accommodation destination device, the plurality of second transfer paths not passing through the abnormal relay device;
        allocating identical path identification information to two or more of the plurality of first transfer paths which share the identical accommodation destination device as the exit;
        allocating to each of the plurality of second transfer paths separate path identification information that is different from the path identification information allocated to two or more of the plurality of first transfer paths, each exits of which is the accommodation destination device identical to the accommodation destination device that is the exit of each of the plurality of second transfer paths;
        generating, for each of abnormal adjacent relay devices that is adjacent to the abnormal relay device, first rule information including the path identification information allocated to two or more of the plurality of first transfer paths which pass through each of the abnormal adjacent relay devices and the path identification information allocated to two or more of the plurality of second transfer paths which pass through each of the abnormal adjacent relay devices; and
        transmitting the generated first rule information to the corresponding abnormal adjacent relay device.

2. The data transfer control device according to claim 1, wherein,
    the identical path identification information is allocated to two or more of the plurality of second transfer paths is identical when the two or more of the plurality of second transfer paths include an identical path component extending from the abnormal relay device to the exit of the two or more of the plurality of second transfer paths.

3. The data transfer control device according to claim 1, wherein the process further includes:
    generating, for each of the relay devices, second rule information by associating the path identification information with device identification information identifying a relay device to which each of the relay devices directly sends data addressed to the accommodation destination device when using a transfer path to which the path identification information is allocated in accordance with the plurality of the first transfer paths and the plurality of the second transfer paths;
    transmitting the generated second rule information to the corresponding relay device;
    generating third rule information by associating the state information with the path identification information allocated to two or more of the plurality of first transfer paths each exits of which is the accommodation destination device that collects the state information; and
    transmitting the generated third rule information to each of the relay devices.

4. The data transfer control device according to claim 2, wherein the process further includes:
    generating, for each of the relay devices, second rule information by associating the path identification information with device identification information identifying a relay device to which each of the relay device directly sends data addressed to the accommodation destination device when using a transfer path to which the path identification information is allocated in accordance with the plurality of the first transfer paths and the plurality of the second transfer paths;
    transmitting the generated second rule information to the corresponding relay device;
    generating third rule information by associating the state information with the path identification information allocated to two or more of the plurality of first transfer paths, each exits of which is the accommodation destination device that collects the state information; and
    transmitting the third rule information to each of the relay devices.

5. The data transfer control device according to claim 1, wherein the each of the second transfer paths is a minimal link delay path such that a total of the delay for each link is minimal with respect to a path component of each of the plurality of second transfer paths that extends from the abnormal relay device to the exit of each of the plurality of second transfer paths.

6. The data transfer control device according to claim 1, wherein each of the plurality of first transfer path is utilized as a transfer path for a main signal.

7. The data transfer control device according to claim 1, wherein each of the plurality of first transfer path is a minimal link delay path such that a total of the delay for each link of the each of the plurality of first transfer path is minimal.

8. A data transfer control method of a data transfer control device for controlling a data transfer path for relay devices configuring a network system, the data transfer control method comprising:
    specifying by a processor, for each of the relay devices and in accordance with a topology of the relay devices and a delay of a link for each of adjacent relay devices, a plurality of first transfer paths for state information indicative of a link state including the delay of the link, the link existing between each of the relay devices and each of the adjacent relay devices, each of the adjacent relay devices being adjacent to each of the relay devices, each of the plurality of first transfer paths being a path whose entry is each of other of the relay devices and whose exit is an accommodation destination device that is each of the adjacent relay devices;

specifying by the processor, for each of the relay devices and in accordance with the topology and the delay of the link, a plurality of second transfer paths for the state information, each of the plurality of second transfer paths being an available path even when one of the relay devices becomes abnormal and also being a path whose entry is each of the relay devices excluding the abnormal relay device and whose exit is the accommodation destination device, the plurality of second transfer paths not passing through the abnormal relay device;

allocating by the processor identical path identification information to two or more of the plurality of first transfer paths which share the identical accommodation destination device as the exit;

allocating by the processor to each of the plurality of second transfer paths separate path identification information that is different from the path identification information allocated to two or more of the plurality of first transfer paths, each exits of which is the accommodation destination device identical to the accommodation destination device that is the exit of each of the plurality of second transfer paths;

generating by the processor, for each of abnormal adjacent relay devices that is adjacent to the abnormal relay device, first rule information including the path identification information allocated to two or more of the plurality of first transfer paths which pass through each of the abnormal adjacent relay devices and the path identification information allocated to two or more of the plurality of second transfer paths which pass through each of the abnormal adjacent relay devices; and transmitting by the processor the generated first rule information to the corresponding abnormal adjacent relay device.

9. A non-transitory computer-readable recording medium having stored therein a program for causing a computer for controlling a data transfer path for relay devices configuring a network system to execute a process comprising:

specifying, for each of the relay devices and in accordance with a topology of the relay devices and a delay of a link for each of adjacent relay devices, a plurality of first transfer paths for state information indicative of a link state including the delay of the link, the link existing between each of the relay devices and each of the adjacent relay devices, each of the adjacent relay devices being adjacent to each of the relay devices, each of the plurality of first transfer paths being a path whose entry is each of other of the relay devices and whose exit is an accommodation destination device that is each of the adjacent relay devices;

specifying, for each of the relay devices and in accordance with the topology and the delay of the link, a plurality of second transfer paths for the state information, each of the plurality of second transfer paths being an available path even when one of the relay devices becomes abnormal and also being a path whose entry is each of the relay devices excluding the abnormal relay device and whose exit is the accommodation destination device, the plurality of second transfer paths not passing through the abnormal relay device;

allocating identical path identification information to two or more of the plurality of first transfer paths which share the identical accommodation destination device as the exit;

allocating to each of the plurality of second transfer paths separate path identification information that is different from the path identification information allocated to two or more of the plurality of first transfer paths, each exits of which is the accommodation destination device identical to the accommodation destination device that is the exit of each of the plurality of second transfer paths;

generating, for each of abnormal adjacent relay devices that is adjacent to the abnormal relay device, first rule information including the path identification information allocated to two or more of the plurality of first transfer paths which pass through each of the abnormal adjacent relay devices and the path identification information allocated to two or more of the plurality of second transfer paths which pass through each of the abnormal adjacent relay devices; and transmitting the generated first rule information to the corresponding abnormal adjacent relay device.

* * * * *